(12) United States Patent
Olarig

(10) Patent No.: US 6,567,880 B1
(45) Date of Patent: May 20, 2003

(54) COMPUTER BRIDGE INTERFACES FOR ACCELERATED GRAPHICS PORT AND PERIPHERAL COMPONENT INTERCONNECT DEVICES

(75) Inventor: Sompong Paul Olarig, Pleasanton, CA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 10/109,441

(22) Filed: Mar. 28, 2002

(51) Int. Cl.[7] .......................... G06F 13/00; G06F 13/40
(52) U.S. Cl. ..................... 710/306; 710/305; 710/309; 712/32
(58) Field of Search ................................ 710/305, 306, 710/313, 309, 310, 314, 1, 62, 72, 52; 712/1, 32, 29, 33; 709/253, 203; 711/100; 345/531, 519; 370/911; 361/683

(56) References Cited
U.S. PATENT DOCUMENTS 5,857,086 A * 1/1999 Horan et al.
5,889,970 A   3/1999 Horan et al.
5,892,964 A   4/1999 Horan et al.
5,937,173 A * 8/1999 Olarig et al.

* cited by examiner

Primary Examiner—Gopal C. Ray
(74) Attorney, Agent, or Firm—Fletcher, Yoder & Van Someren

(57) ABSTRACT

A core logic chip set is provided in a computer system to provide a bridge between host and memory buses and an accelerated graphics port ("AGP") bus adapted for operation of two AGP devices, or one AGP device and one peripheral component interconnect ("PCI") device. A common AGP bus having provisions for the PCI and AGP interface signals is connected to the core logic chip set and the AGP and/or PCI device(s). The core logic chip set has an AGP/PCI arbiter having Request ("REQ") and Grant ("GNT") signal lines for each AGP and/or PCI device connected to the AGP bus. Another embodiment has a plurality of AGP buses for a plurality of AGP devices. This allows concurrent operation for AGP devices connected to different AGP buses. Two of the AGP buses may be combined to connect to one 64 bit PCI device.

20 Claims, 27 Drawing Sheets

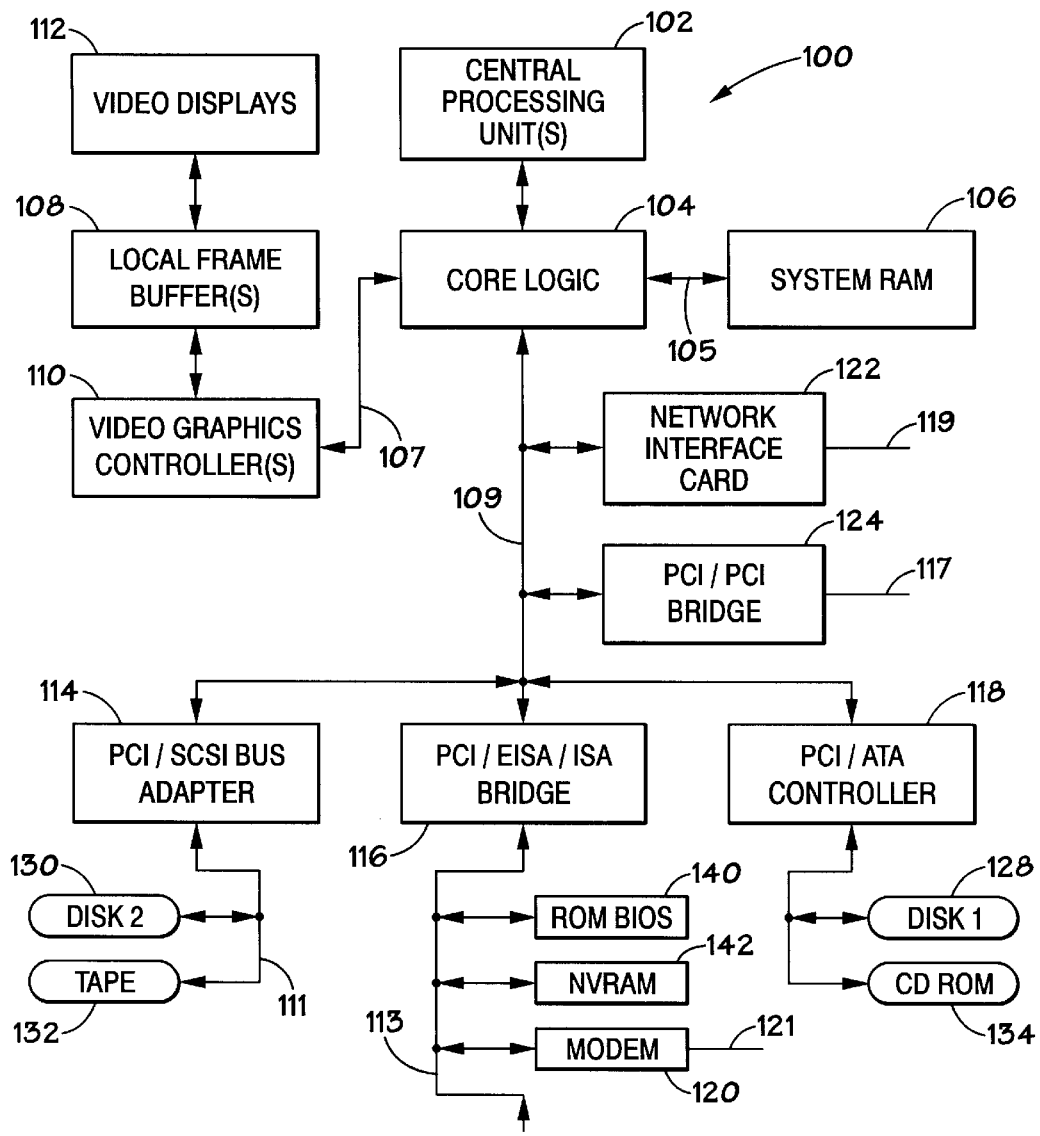
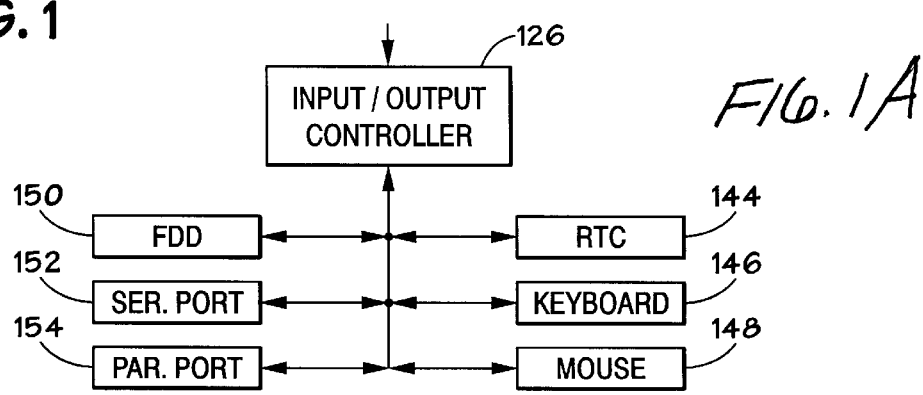
FIG. 1
FIG. 1A

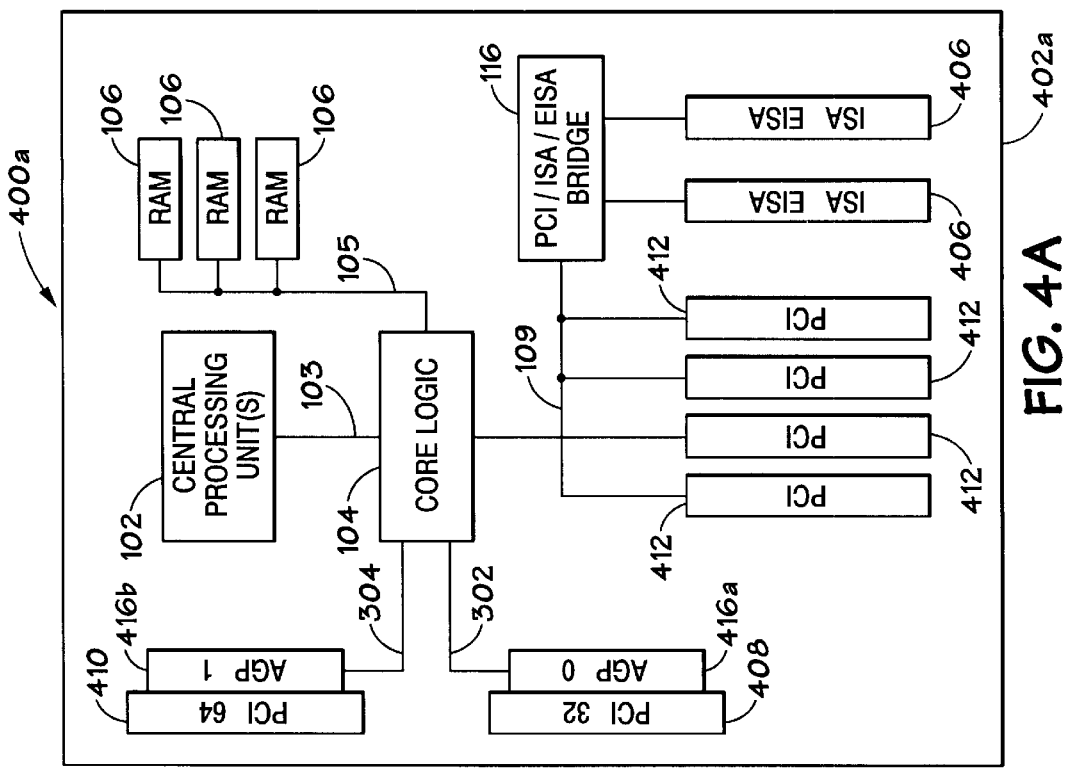
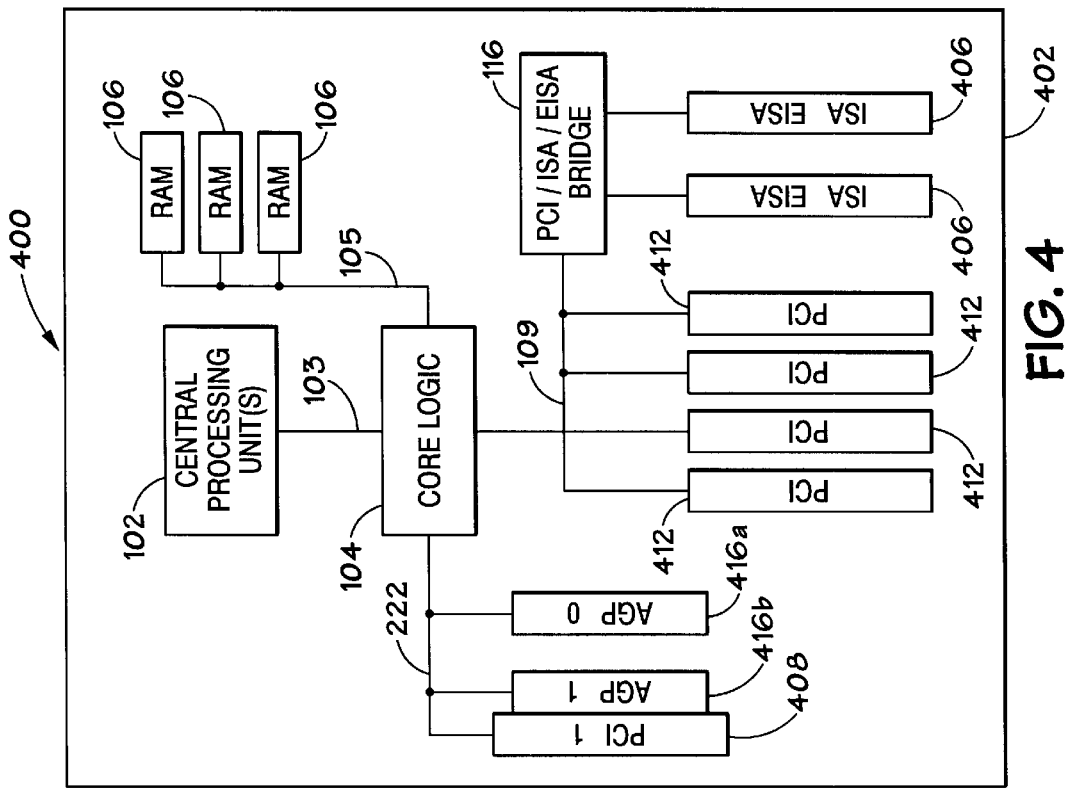

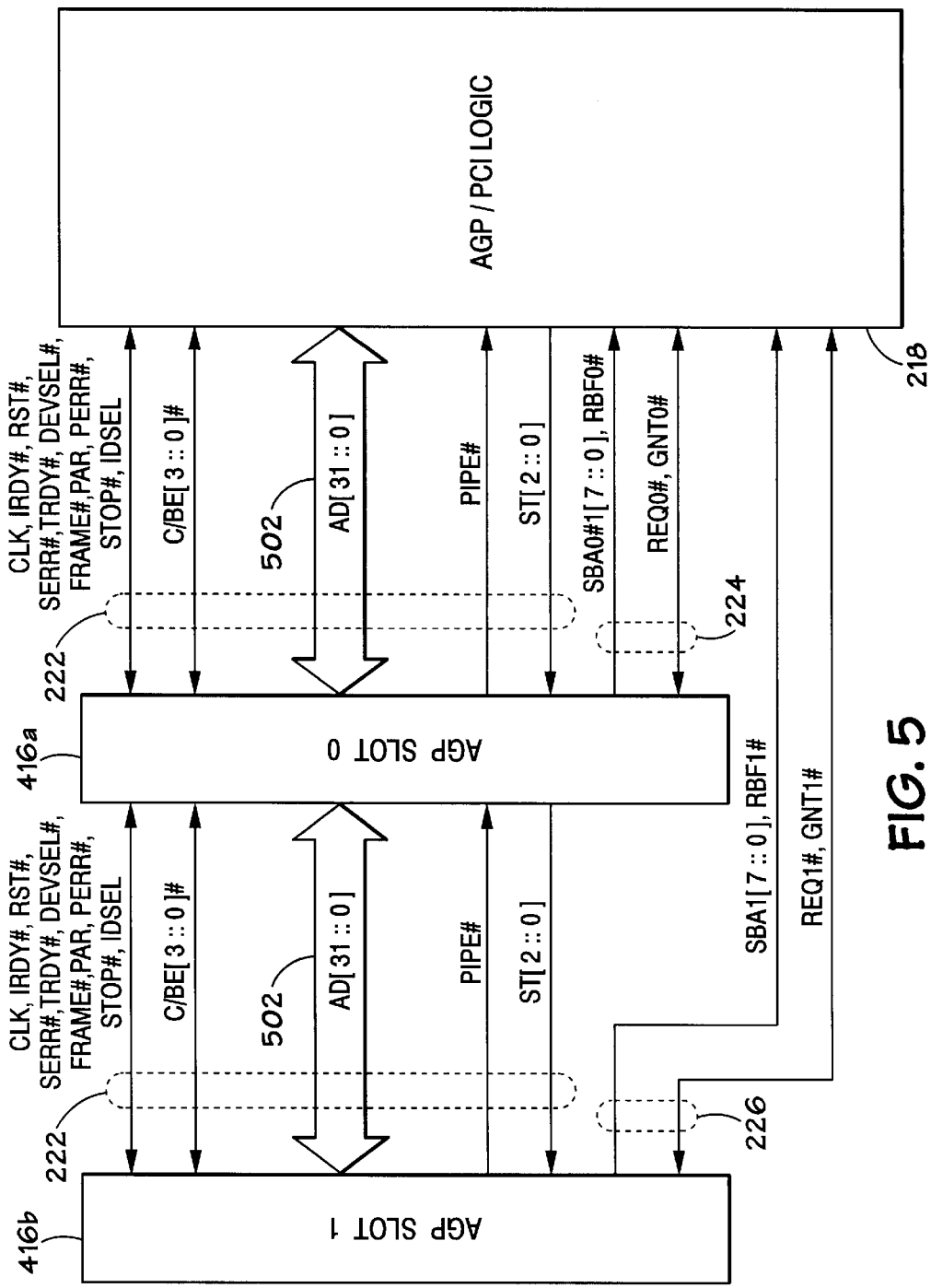

COMPUTER BRIDGE INTERFACES FOR ACCELERATED GRAPHICS PORT AND PERIPHERAL COMPONENT INTERCONNECT DEVICES

BACKGROUND OF THE INVENTION

1. Field of the Invention

The present invention relates to computer systems using a bus bridge(s) to interface a central processor(s), video graphics processor(s), random access memory and input-output peripherals together, and more particularly, and more particularly, in utilizing a bus bridge(s) in a computer system for dual accelerated graphics ports.

2. Description of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be stand-alone workstations (high end individual personal computers), desk-top personal computers, portable lap-top computers and the like, or they may be linked together in a network by a "network server" which is also a personal computer which may have a few additional features specific to its purpose in the network. The network server may be used to store massive amounts of data, and may facilitate interaction of the individual workstations connected to the network for electronic mail ("E-mail"), document databases, video teleconferencing, white boarding, integrated enterprise calendar, virtual engineering design and the like. Multiple network servers may also be interconnected by local area networks ("LAN") and wide area networks ("WAN").

A significant part of the ever increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system microprocessor central processing unit ("CPU"). The peripheral devices' data transfer speeds are achieved by connecting the peripheral devices to the microprocessor(s) and associated system random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI."

Several official specifications and other documents relating to various aspects of the PCI Local Bus are currently available from the PCI Special Interest Group. Some examples of those documents include the PCI Local Bus Specification, revision 2.1; the PCI Local Bus Specification, revision 2.2 (PCI Conventional 2.2 Specification), the PCI-X 1.0a Specification, the Mini PCI Specification, the PCI/PCI Bridge Specification, revision 1.0; the PCI System Design Guide, revision 1.0; the PCI BIOS Specification, revision 2.1, the Small PCI 1.5s Specification, and the Engineering Change Notice ("ECN") entitled "Addition of 'New Capabilities' Structure," dated May 20, 1996, the disclosures of which are hereby incorporated by reference. These PCI specifications and ECN are available from the PCI Special Interest Group, P.O. Box 14070, Portland, Oreg. 97214.

A computer system has a plurality of information (data and address) buses, such as a host bus, a memory bus, at least one high speed expansion local bus such as the PCI bus, and other peripheral buses such as the Small Computer System Interface (SCSI), Extension to Industry Standard Architecture (EISA), and Industry Standard Architecture (ISA). The microprocessor(s) of the computer system communicates with main memory and with the peripherals that make up the computer system over these various buses. The microprocessor(s) communicates to the main memory over a host bus to memory bus bridge. The peripherals, depending on their data transfer speed requirements, are connected to the various buses which are connected to the microprocessor host bus through bus bridges that detect required actions, arbitrate, and translate both data and addresses between the various buses.

Increasingly sophisticated microprocessors have revolutionized the role of the personal computer by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM", "PENTIUM PRO", "PENTIUM II", "PENTIUM III" and "PENTIUM 4 (registered trademarks of Intel Corporation). Advanced microprocessors are also manufactured by Advanced Micro Devices, Cyrix, IBM, Digital Equipment Corp., and Motorola.

These sophisticated microprocessors have, in turn, made possible running complex application programs using advanced three dimensional ("3-D") graphics for computer aided drafting and manufacturing, engineering simulations, games and the like. Increasingly complex 3-D graphics require higher speed access to ever larger amounts of graphics data stored in memory. This memory may be part of the video graphics processor system, but, preferably, would be best (lowest cost) if part of the main computer system memory. Intel Corporation has proposed a low cost but improved 3-D graphics standard called the "Accelerated Graphics Port" (AGP) initiative. With AGP 3-D, graphics data, in particular textures, may be shifted out of the graphics controller local memory to computer system memory. The computer system memory is lower in cost than the graphics controller local memory and is more easily adapted for a multitude of other uses besides storing graphics data.

The Intel AGP 3-D graphics standard defines a high speed data pipeline, or "AGP bus," between the graphics controller and system memory. This AGP bus has sufficient bandwidth for the graphics controller to retrieve textures from system memory without materially affecting computer system performance for other non-graphics operations. The Intel 3-D graphics standard is a specification which provides signal, protocol, electrical, and mechanical specifications for the AGP bus and devices attached thereto. This specification is entitled "Accelerated Graphics Port Interface Specification Revision 1.0, " dated Jul. 31, 1996, ("AGP1.0") the disclosure of which is hereby incorporated by reference. Enhancements to the AGP1.0 Specification are included in the "Accelerated Graphics Port Interface Specification Revision 2.0, " dated May 4, 1998 ("AGP2.0"), the disclosure of which is hereby incorporated by reference. Both the AGP1.0 and AGP2.0 Specifications are available from Intel Corporation, Santa Clara, Calif.

The AGP1.0 interface specification uses the 66 MHz PCI (Revision 2.1) specification as an operational baseline, with three performance enhancements to the PCI specification which are used to optimize the AGP1.0 Specification for high performance 3-D graphics applications. These enhancements are: 1) pipelined memory read and write operations, 2) demultiplexing of address and data on the AGP bus by use of sideband signals, and 3) data transfer rates of 133 MHz for data throughput in excess of 500 megabytes per second ("MB/s"). The remaining AGP1.0 Specification does not modify the PCI specification, but rather provides a range of graphics-oriented performance enhancements for use by 3-D graphics hardware and software designers. The AGP1.0 Specification is neither meant to replace nor diminish full use of the PCI standard in the computer system. The AGP1.0 Specification creates an independent and additional high speed local bus for use by 3-D graphics devices such as a graphics controller, wherein the other input-output ("I/O") devices of the computer system may remain on any combination of the PCI, SCSI, EISA and ISA buses. The AGP1.0 Specification supports only 32-bit memory addressing. Further definition and enhancement of the AGP 1.0 Specification is more fully defined in "Compaq's Supplement to the 'Accelerated Graphics Port Interface Specification Version 1.0'," Revision 0.8, dated Apr. 1, 1997, which is hereby incorporated by reference.

The AGP2.0 Specification supports 64-bit memory addressing, which is beneficial for addressing memory sizes allocated to the AGP device that are larger than 2 GB. The AGP2.0 Specification also includes several other enhancements. For example, the AGP2.0 Specification supports 1) 4×transfer mode with low (1.5V voltage electrical signals that allows four data transfers per 66 MHz clock cycle, providing data throughput of up to 1 GB/second; 2) five additional sideband signals; 3) a fast write protocol; 4) new input/output buffers; and 5) new mechanical connectors. The AGP 2.0 Specification is hereby incorporated by reference herein, and is attached hereto as Appendix A.

A draft version of the AGP 8×Specification (AGP Specification 3.0, Draft Version 0.95) was promulgated by Intel in May, 2001. The AGP3.0 data bus introduces AGP 8×transfer mode, which provides a peak theoretical bandwidth of 2.1 GB/s (32 bits per transfer at 533 MT/s). Both the common clock and source synchronous data strobe operation and protocols are similar to those employed by AGP2.0 with all modifications guided by the need to support the 8×data transfer rate of AGP3.0's source synchronous mode. The AGP 3.0 Specification, Draft Version 0.95, is hereby incorporated by reference herein, and is attached hereto as Appendix B.

Regardless of the version of the AGP specification, to functionally enable the AGP 3-D graphics bus, new computer system hardware and software are required. This requires new computer system core logic designed to function as a host bus/memory bus/PCI bus to AGP bus bridge meeting the AGP1.0 or AGP2.0 Specifications, and new Read Only Memory Basic Input Output System ("ROM BIOS") and Application Programming Interface ("API") software to make the AGP dependent hardware functional in the computer system. The computer system core logic must still meet the PCI and/or PCI-X standards referenced above and facilitate interfacing the PCI bus(es) to the remainder of the computer system. In addition, new AGP compatible device cards must be designed to properly interface, mechanically and electrically, with the AGP bus connector.

AGP and PCI device cards are not physically or electrically interchangeable even though there is some commonality of signal functions between the AGP and PCI interface specifications. The AGP specifications only make allowance for a single AGP device on an AGP bus. Whereas the PCI specification allows two PCI devices on a PCI bus running at 66 MHz. The single AGP device is capable of functioning in a 1×mode (264 MB/s peak), a 2×mode (532 MB/s peak), a 4×mode (1 GB/s peak) or an 8×mode (theoretical limit of 2.1 GB/s peak). The AGP bus is defined as a 32 bit bus, or four bytes per data transfer. The PCI bus is defined as either a 32 bit or 64 bit bus, or four or eight bytes per data transfer, respectively. The AGP bus, however, has additional sideband signals which enable it to transfer blocks of data more efficiently than is possible using a PCI bus.

The purpose of the original AGP bus and the extensions set forth in subsequent versions of the specification is to provide sufficient video data throughput to allow increasingly complex 3-D graphics applications, particularly games, to run on personal computers. Some personal computer uses do not require high end 3-D graphics, but would greatly benefit from having an additional AGP card slot for accepting an additional input-output device such as another video graphics card (dual head monitors), a high speed network interface card ("NIC"), a SCSI adapter, a wide area network digital router, and the like. Since the AGP specification is comprised of a superset of the 66 MHz, 32 bit PCI specification, a PCI device may also function on the AGP bus (different card slot connectors for the AGP and PCI device cards would be necessary). Thus, embedded (directly connected to the computer system motherboard) or card slot pluggable AGP and PCI devices could share the same AGP/PCI bus, controller and arbiter of a core logic chip set used in a computer system.

What is needed is an apparatus, method, and system for a personal computer that provides a core logic chip set having an AGP interface connected to an AGP bus and being capable of accommodating an additional AGP or PCI device on the AGP bus.

SUMMARY OF THE INVENTION

The present invention provides a core logic chip set that is capable of being a bridge between an AGP bus and host and memory buses wherein two AGP devices, or an AGP device and a PCI device may be connected to the AGP bus. An AGP bus having provisions for the AGP and PCI interface signals is connected to the core logic chip set and is adapted for connection to either two AGP devices or an AGP device and a PCI device. The core logic chip set of the present invention uses one of its arbiters for the two AGP devices or the AGP device and the PCI device on the AGP bus, and has Request ("REQ") and Grant ("GNT") signal lines for each one of the devices connected to the AGP bus.

Two AGP devices, or one AGP device and one PCI device may be embedded on the computer system motherboard, or either or both devices may be on a separate card(s) which plugs into a corresponding card edge connector(s) attached to the system motherboard and connected to the AGP bus. The embodiments of the present invention contemplate a core logic chip set which may be one or more integrated circuit devices such as an Application Specific Integrated Circuit ("ASIC"), Programmable Logic Array ("PLA") and the like.

The core logic chip set is connected to an AGP bus and provides for two AGP devices, or one AGP device and one PCI device connected to the AGP bus. Separate request (REQ#) and grant (GNT#) lines are provided for each device on the AGP bus. The AGP bus transfers data in the AGP 1×mode or PCI mode at up to 264 MB/s peak, depending upon whether an AGP device or PCI device, respectively, is the active device on the AGP bus. The present invention also contemplates two AGP devices in the 2×mode transferring data at up to 532 MB/s peak on the AGP bus, two AGP devices in the 4×mode transferring data at up to 1 GB/s peak or two AGP devices in the 8×mode transferring data at up to 2.1 GB/s peak.

An embodiment of the present invention utilizes a common bus for address, data and some control signals for both AGP and PCI devices. Separate "Sideband Address Port" ("SBA[7::0]") signal buses and "Read Buffer Full" ("RBF#") signal lines may be provided for each AGP device and are separate and distinct from the common bus. In this embodiment a PCI device may function as a 32 bit address and data width device running at a clock frequency of 66 MHz, as more fully defined in the PCI 2.1 Specification and the PCI 2.2 Specification, which are both incorporated by reference above. Separate Sideband Address Port (SBA [7::0]) signals for each AGP device enable concurrent pipelined data requests by allowing address information cycles to occur separate from the common 32 bit data bus ("AD [31::0]"), as more fully defined in the AGP Specification incorporated by reference. The AGP device(s) may also use PIPE addressing which uses the common data bus (AD [31::0]) for asserting address information. The PCI device must always use the AD[31::0] bus for addressing information.

Another embodiment of the present invention utilizes a separate bus for each AGP device (32 bit address and data width) and can utilize these separate buses as one bus for a 64 bit PCI device. In addition, a plurality of AGP buses are contemplated herein for the core logic chip set of the present invention. Multiples of two independent AGP buses also allow a plurality of 64 bit PCI devices to be accommodated with the present invention.

A bus switch in the core logic chip set combines the separate AGP buses into one PCI bus during computer system configuration or during Power On Self Test ("POST") so that each device in the computer system (AGP or PCI) may be determined. When the computer system is first powered on and POST begins, the startup configuration software must scan the PCI bus or buses to determine what PCI or AGP devices exist and what configuration requirements they may have. This process is commonly referred to as enumerating, scanning, walking or probing the bus. It may also be referred to as the discovery process. The software program which performs the discovery process may be referred to as the PCI bus enumerator. Both AGP and PCI device enumeration is done via PCI bus transactions.

During this discovery process, the AGP device registers are accessed using PCI bus cycles through a host/PCI bridge or PCI/PCI bridge. Each device has a different "device number" as more fully defined in the PCI 2.2 Specification. A first AGP device would typically be hardwired as bus device number 0, having its IDSEL connected to AD16 of the AD[31::0] bus. A second AGP device would typically be hardwired as bus device number 1, having its IDSEL connected to AD17 of the AD[31::0] bus. The PCI device could be any bus device number 1–15 connected to AD17–31 (one only), respectively. The appropriate IDSEL lines may then be used to access the configuration registers of the AGP and PCI devices so as to read the capabilities of each device and its system requirements. Once information for all of the bus devices is determined, the core logic may be configured to the desired combination of either two AGP devices, or an AGP device and a PCI device.

The AGP transfer speed (AGP mode 1×, 2×, 4× or 8×) is not configured during POST. The AGP mode may be configured with an Application Programming Interface ("API") software of the operating system software. In the present invention, however, the computer system POST software may configure the AGP Status Register of the core logic chip set whose address is defined in the Capabilities Pointer (offset 34*h*) bits 7:0, the byte offset stored therein is hereinafter referred to as "CAP_PTR."

The AGP devices use the PCI "New Capabilities" structure, as more fully defined in the PCI 2.1 Specification ECR, incorporated by reference above, to implement a linked list of registers containing information for each function supported by the device. The "New Capabilities" ECR is included in the PCI 2.2 Specification, which is incorporated by reference above. AGP status and command registers are included in the linked list of registers. In the AGP status register (offset CAP_PTR+4) the RATE field indicates the data transfer rates supported by the device. In the AGP command register (offset CAP_PTR+8) one bit in the DATA_RATE field is set to indicate the desired data transfer rate. Both AGP master and target devices must have the same bit set in the respective DATA_RATE fields, i.e., both AGP master and target must be capable of transferring data at the same rate, either 1×, 2×, 4× or 8×.

The present invention contemplates running AGP devices in either the 1×, 2×, 4× or 8×mode. API software sets the AGP master and target devices to operate at a common compatible AGP mode. Thus the core logic chip set RATE bits in the AGP status register (offset CAP_PTR+4) may force the API software to configure the AGP master device cards to the 1×mode if the core logic chip set indicates to the API software that only 1×mode is available. If the core logic indicates to the API software that it is capable of AGP 2×, 4× or 8×modes, then the AGP master device(s) may be configured to run in one of those modes. This is true for all AGP devices since only one AGP command register is defined in the AGP specification.

The AGP Status Register (CAP_PTR+4) "RATE field" (bits 1:0) define the data transfer rates (mode 1×, 2×, 4× or 8×) supported by the associated AGP device, i.e., the core logic chip set and AGP master(s). When two AGP devices are detected, or when one AGP device and one PCI device are detected during POST, the Rate field in the AGP Status Register of the core logic chip set may be configured by the POST software to indicate that only AGP 1×mode is available. If only one AGP device and no PCI device is detected, then the Rate field may be configured by the POST software to indicate that an AGP 2× mode, 4× mode or 8×mode is available. It is contemplated in the present invention that the Rate field in the AGP Status Register may be configured through a "back door" hardware register of the computer system that is accessible by the startup software in the ROM BIOS. The Rate field being set by the back door register after POST determines whether the AGP 8x, 4x, 2x or 1x mode is appropriate. The API software may then read the RATE field in the Status register of the core logic chip set and will then configure the DATA_RATE field in the AGP command register (offset CAP_PTR+8) of each AGP master device for the AGP mode (1x, 2x, 4x or 8x) previously programmed after POST.

In the AGP 2x mode, 8 bytes of data are transferred during each single clock ("CLK") cycle. The AD[31::0] bus is 32 bits or 4 bytes wide, thus, two 4 byte data transfers must be made during each CLK cycle. This is accomplished in the AGP 2x mode by using additional source synchronous strobes derived from the AGP clock (CLK). These strobe signals are: AD_STB0 and AD_STB1 which indicate when valid data is present on AD[31::0], and SB_STB which is used in conjunction with the SBA[7::0] signals. These strobe signals allow an effective data transfer rate of eight (8) bytes of data per AGP CLK (66 MHz). In the present invention, separate strobe signals may be used between each AGP connector and the core logic chipset so as not to excessively load down the strobe signals.

AGP 2.0 4x data transfers are similar to 2x transfers except an entire 16 bytes can be transferred during a single CLK period. This requires that four 4 byte pieces of data are transferred across the AD bus per CLK period. First a read data transfer will be discussed, and then a write transfer. The control signals are identical as for the 2xread, except that AD_STBx# has been added when data is transferred at 16 bytes per CLK period. AD_STBx# represents the compliment of AD_STB0 and AD_STB1 and are used with AD_STB0 and AD_STB1 by the 4xinterface logic to know when valid data is present on the AD bus. The receiving agent has two choices of how it uses the four strobes to latch data.

The first choice is to use only the falling edge of each strobe to latch data. The first falling edge of AD_STB0 is used to determine when the receiving agent latches the first four bytes of data residing on the AD bus, and the first falling edge of AD_STB0# is used to latch the second 4 bytes of the transaction. The second falling edge of AD_STB0 is used to determine when the receiving agent latches the third four bytes of data residing on the AD bus, and the second falling edge of AD_STB0# is used to latch the fourth 4 bytes of the transaction. Note that the rising edges of AD_STBx or AD_STBx# are never used to latch data when in the 4xtransfer mode.

The second choice is to use the strobes as differential pairs and not as four separate signals. The compliment pairs are AD_STB0 and AD_STB0#; and AD_STB1 and AD_STB1#. When this choice is used, an internal latch signal is created in which data is latched on both the falling and rising edges. Assume for illustration purposes that the internal signal is AD_STBx in FIG. 6A. The first falling edge of AD_STBx is used to determine when the receiving agent latches the first 4 bytes of data residing on the AD bus and the first rising edge of AD_STBx is used to latch the second 4 bytes of the transaction. The second falling edge of AD_STBx is used to determine when the receiving agent latches the third 4 bytes of data residing on the AD bus and the second rising edge of AD_STBx is used to latch the fourth 4 bytes of the transaction. Note that the rising edges of the internal signal are used to latch data when in the 4xtransfer mode.

The AGP 3.0 Specification introduces the 8xtransfer mode, which is implemented in part using the signals AD_STBF[1:0], AD_STBS[1:0], DBI_HI and DBI_LO. The details of how those signals are implemented are set forth in the AGP 3.0 Specification, which is incorporated by reference above.

A PCI device may be recognized by its register configuration during system configuration or POST, and the speed of operation of the PCI device may be determined during POST by reading the 66 MHz-CAPABLE bit in the status register, and/or by a hardwired electrical signal "M66EN" as an active "high" input to the 66 MHz PCI device card. If any of the PCI devices on the PCI bus are not 66 MHz capable then the non-66 MHz capable PCI card will deactivate the M66EN signal pin by pulling it to ground reference. If all PCI devices on the PCI bus are 66 MHz capable then M66EN remains active high and each 66 MHz capable PCI card will operate at a 66 MHz bus speed.

The PCI 2.2 Specification supports a high 32 bit bus, referred to as the 64 bit extension to the standard low 32 bit bus. The 64 bit bus provides additional data bandwidth for PCI devices that require it. The high 32 bit extension for 64 bit PCI devices requires an additional 39 signal pins: REQ64#, ACK64#, AD[63::32], C/BE[7::4]#, and PAR64. These signals are defined more fully in the PCI 2.1 Specification incorporated hereinabove. 32 bit PCI devices work unmodified with 64 bit PCI devices. A 64 bit PCI device must default to 32 bit operation unless a 64 bit transaction is negotiated. 64 bit transactions on the PCI bus are dynamically negotiated (once per transaction) between the master and target PCI devices. This is accomplished by the master asserting REQ64# and the target responding to the asserted REQ64# by asserting ACK64#. Once a 64 bit transaction is negotiated, it holds until the end of the transaction. The REQ64# and ACK64# signals are externally held to a deasserted state by pull up resistors to ensure proper behavior when mixing 32 bit and 64 bit data width PCI devices on the PCI bus. A central resource controls the state of REQ64# to inform the 64 bit data width PCI device that it is connected to a 64 bit data width bus. If REQ64# is deasserted when RST# is deasserted, the PCI device is not connected to a 64-bit data width bus. If REQ64# is asserted when RST# is deasserted, the PCI device is connected to a 64 bit data width bus.

In the present invention, the AGP slot number 0 would be the first AGP slot to install an AGP compliant device card. Either AGP slot number 1 or PCI slot number 1 would receive the second AGP or PCI device, respectively. The first AGP slot number 0 would always have sideband addressing SBA[7::0] signals functionally connected to the core logic chip set. The second AGP slot number 1 could have the sideband addressing signals connected or not. A preferred embodiment of the present invention uses sideband addressing for both AGP devices. However, if no sideband addressing signals are connected to the AGP slot number 1, then the AGP device plugged into slot number 1 may use PIPE addressing exclusively (except in 8xmode, for which PIPE addressing is not supported). Both AGP devices could potentially use PIPE addressing instead of one using sideband addressing and the other using PIPE addressing. Sideband addressing must be used for both devices if support for 8xtransfer mode is desired. Transferring data using AGP modes 1x, 2x, 4x or 8xis contemplated in the present invention as disclosed above.

Since sideband addressing (SBA[7::0]) may be concurrent with data transfers on the AGP bus (AD[31::0]), separate address and data queues in the core logic chip set are contemplated for each AGP device. During data transfers, the appropriate AGP device is selected by its respective GNT# signal from the core logic chip set. Data is returned to the requesting AGP device in the order of the previously asserted addresses.

In another embodiment, a PCI device card connector may be placed proximate to an AGP device card connector on the computer system motherboard, and both PCI and AGP connectors may be connected to the AGP bus as logical slot 1 (REQ1# and GNT1#). It is contemplated in the present invention that either an AGP device card or a PCI device card, but not both, may be plugged into connector (AGP or PCI, respectively) slot 1. The PCI device plugged into the PCI slot number 1 connector would use the FRAME# signal instead of the PIPE# signal.

In the embodiment having two separate AGP buses, one for each AGP card slot, a 64 bit PCI device may be accommodated by using the address and data lines of the bus to the AGP slot number 0 for the AD[31::0] signals and the address and data lines of the bus to the AGP slot number 1 for the AD[63::32] signals. The AGP device in slot number 0 would maintain its data transaction operations on the AD[31::0] bus using either sideband addressing or PIPE addressing. PIPE addressing is not supported by the AGP 3.0 Specification, so PIPE addressing may not be used if AGP 8×transfer mode is desired.

The PCI device would operate as a 64 bit device by using both of the AGP buses for the AD[63::0] signals. Registered PCI ("RegPCI") is also contemplated herein for the present invention, as more fully described in commonly owned U.S. Pat. No. 6,067,590, issued on May 23, 2000, entitled "Data Bus Agent Including a Storage Medium Between a Data Bus and the Bus Agent Device" by Dwight Riley and Christopher J. Pettey; and U.S. Pat. No. 5,937,173, issued on Aug. 10, 1999, entitled "Dual Purpose Computer Bridge Interface for Accelerated Graphics Port or Registered Peripheral Component Interconnect Devices" by Sompong Olarig, Dwight Riley and Ronald T. Horan. Both of these patent applications are hereby incorporated by reference.

It is contemplated that AGP and PCI devices such as video controllers capable of driving dual headed monitors, SCSI arrays, high speed network interface cards, asynchronous transfer mode ("ATM") routers and the like, may be used with the dual AGP apparatus, method and system of the present invention. Memory coherency of PCI transactions could be accomplished in accordance with Revision 2.2 of the PCI Local Bus Specification.

Other features and advantages will be apparent from the following description of presently preferred embodiments of the invention, given for the purpose of disclosure and taken in conjunction with the accompanying drawings.

BRIEF DESCRIPTION OF THE DRAWINGS

The foregoing and other advantages of the invention will become apparent upon reading the following detailed description and upon reference to the drawings in which:

FIGS. 1 and 1A are schematic block diagram of a computer system;

FIGS. 4, 4A, 4B and 4C are schematic plan views of computer system motherboards, according to the present invention;

FIG. 5 is a schematic functional block diagram of signal routing of a two AGP connector embodiment of the present invention;

DETAILED DESCRIPTION OF SPECIFIC EMBODIMENTS

Figure 2:
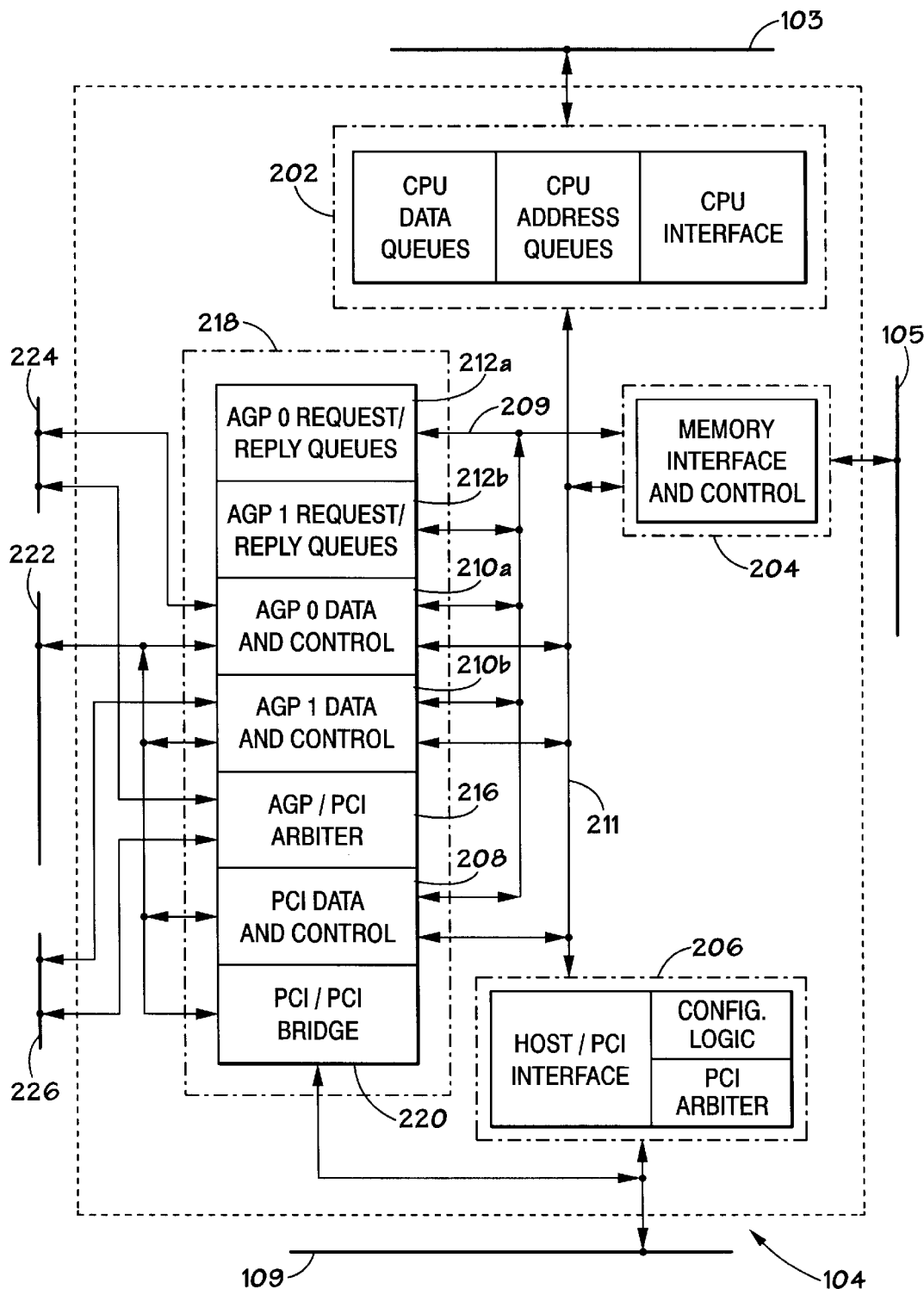
FIG. 2 is a schematic functional block diagram of an embodiment of the present invention according to the computer system of FIG. 1.

The following patents or patent applications are hereby incorporated by reference:

U.S. Pat. No. 5,889,970, issued on Mar. 30, 1999, entitled "Dual Purpose Apparatus, Method and System for Accelerated Graphics Port and Peripheral Component Interconnect" by Ronald T. Horan and Sompong P. Olarig.

U.S. Pat. No. 5,892,964, issued on Apr. 6, 1999, entitled "Computer Bridge Interfaces for Accelerated Graphics Port and Peripheral Component Interconnect Devices" by Ronald T. Horan, Gary W. Thome and Sompong P. Olarig.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present invention provides a core logic chipset in a computer system which is capable of implementing a bridge between host processor and memory buses, an AGP bus adapted for two AGP devices, or one AGP device and one PCI device connected thereto. The AGP bus was developed to have sufficient data bandwidth for a video controller in a computer system, up to 1 GB/s in Revision 2.0, to run increasingly complex three dimensional ("3-D") graphics applications such as, for example, games and engineering simulations. Not all computer applications, however, require the capability of running 3-D graphics at 2.1 GB/s, 1 GB/s or even 532 MB/s, but would greatly benefit by having an additional AGP card slot or PCI card slot for another video graphics card, a high speed NIC, a SCSI adapter, a wide area network digital router, or the like. Computers used as network servers or workstations would greatly benefit by having the ability to use two AGP devices, or an AGP device and a PCI device at a combined data transfer rate of up to 2.1 GB/s, 1 GB/s, 532 MB/s or 264 MB/s per device. Also disclosed hereinbelow is an embodiment of the present invention which is capable of data transfer rates of 1 GB/s for each AGP device.

Operation at bus speeds in excess of the requirements set forth in the AGP 2.0 or AGP 3.0 Specifications are contemplated with the present invention. As bus speeds increase, however, the number of devices on the bus may need to be reduced.

For illustrative purposes, preferred embodiments of the present invention are described hereinafter for computer systems utilizing the Intel x86 microprocessor architecture and certain terms and references will be specific to that processor platform. AGP and PCI are interface standards, however, that are hardware independent and may be utilized with any host computer designed for these interface standards. It will be appreciated by those skilled in the art of computer systems that the present invention may be adapted and applied to any computer platform utilizing the AGP and PCI interface standards.

Referring now to the drawings, the details of preferred embodiments of the present invention are schematically illustrated. Like elements in the drawings will be represented by like numbers, and similar elements will be represented by like numbers with a different lower case letter suffix. Referring now to FIG. 1, a schematic block diagram of a computer system utilizing the present invention is illustrated. A computer system is generally indicated by the numeral 100 and comprises a central processing unit(s) ("CPU") 102, core logic 104, system random access memory ("RAM") 106, a video graphics controller(s) 110, a local frame buffer(s) 108, a video display(s) 112, a PCI/SCSI bus adapter 114, a PCI/EISA/ISA bridge 116, and a PCI/ATA controller 118. Single or multilevel cache memory (not illustrated) may also be included in the computer system 100 according to the current art of microprocessor computer systems. The CPU 102 may be a plurality of CPUs 102 in a symmetric or asymmetric multi-processor configuration.

The CPU(s) 102 is connected to the core logic 104 through a host bus 103. The system RAM 106 is connected to the core logic 104 through a memory bus 105. The video graphics controller(s) 110 is connected to the core logic 104 through an AGP bus 107. The PCI/SCSI bus adapter 114, PCI/EISA/ISA bridge 116, and PCI/ATA controller 118 are connected to the core logic 104 through a primary PCI bus 109. Also connected to the PCI bus 109 are a network interface card ("NIC") 122 and a PCI/PCI bridge 124. Some of the PCI devices such as the NIC 122 and PCI/PCI bridge 124 may plug into PCI connectors on the computer system 100 motherboard (not illustrated).

Hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, and serial/parallel ports 152, 154. The EISA/ISA bus 113 is a slower information bus than the PCI bus 109, but it costs less to interface with the EISA/ISA bus 113.

Referring now to FIG. 2, a schematic functional block diagram of the core logic 104 of FIG. 1, according to the present invention, is illustrated. The core logic 104 functionally comprises CPU host bus interface and queues 202, memory interface and control 204, host/PCI bridge 206, and AGP/PCI logic 218. The AGP/PCI logic 218 comprises PCI/PCI bridge 220, PCI data and control 208, AGP/PCI arbiter 216, AGP0 data and control 210a, AGP1 data and control 210b, AGP0 request/reply queues 212a, and AGP1 request/reply queues 212b. The CPU host bus interface and queues 202 connect to the host bus 103 and include interface logic for all data, address and control signals associated with the CPU(s) 102 of the computer system 100. Multiple CPUs 102 and cache memory (not illustrated) are contemplated and within the scope of the present invention.

The CPU host bus interface and queues 202 interfaces with the host/PCI bridge 206 and memory interface and control 204 over a core logic bus 211. The CPU host bus interface and queues 202 interfaces with the PCI data and control 208, and AGP0 and AGP1 data and control 210a and 210b, respectively, over the core logic bus 211. The memory interface and control 204 interfaces with the PCI data and control 208, AGP0 and AGP1 data and control 210a and 210b, respectively, and AGP0 and AGP1 request/reply queues 212a and 212b, respectively, over a core logic bus 209. An advantage of having separate buses 209 and 211 is that concurrent bus operations may be performed thereover. For example, video data stored in system RAM 106 may be transferring to the video graphics controller 110 (AGP device) while the CPU 102 on the host bus 103 is accessing an independent PCI device (i.e., NIC 122) on the PCI bus 109.

The core logic 104 may include control circuitry that programs the operating voltage of the I/O buffers of AGP0 and AGP1 buses. Voltage control circuitry may be included in the AGP0 and AGP1 data and control blocks 210a and 210b. This circuitry may detect the operational mode (1×, 2×, 4× or 8×) of the AGP buses and program the I/O buffer voltage according to the requirements set forth in the relevant AGP specification.

The host bus interface and queues 202 allows the CPU 102 to pipeline cycles and schedule snoop accesses. The memory interface and control 204 generates the control and timing signals for the computer system RAM 106 which may be synchronous dynamic RAM and the like. The memory interface and control 204 has an arbiter (not illustrated) which selects among memory accesses for CPU writes, CPU reads, PCI writes, PCI reads, AGP reads, AGP writes, and dynamic memory refresh. Arbitration may be pipelined into a current memory cycle, which insures that the next memory address is available on the memory bus 105 before the current memory cycle is complete. This results in minimum delay, if any, between memory cycles. The memory interface and control 204 also is capable of reading ahead on PCI master reads when a PCI master issues a read multiple command, as more fully described in the PCI specification.

The host/PCI bridge 206 controls the interface to the PCI bus 109. When the CPU 102 accesses the PCI bus 109, the host/PCI bridge 206 operates as a PCI master. When a PCI device is a master on the PCI bus 109, the host/PCI bridge 206 operates as a PCI slave. The host/PCI bridge 206 contains base address registers for PCI device targets on its PCI bus 109 (not illustrated).

The PCI data and control 208, AGP0 and AGP1 data and control 210a and 210b, respectively, AGP/PCI arbiter 216, and AGP0 and AGP1 request/reply queues 212a and 212b, respectively, interface to an AGP/PCI bus 222 having signal, power and ground connections (not illustrated) for implementation of signals defined in the AGP and PCI interface standards. The AGP/PCI bus 222 is adapted to connect to two AGP device connectors (not illustrated), and one PCI device connector (not illustrated). Bus 224 connects to one of the AGP connectors and bus 226 connects to the other AGP connector. The buses 224 and 226 carry signals unique to each AGP connector and allow for address request pipelining to the AGP/PCI logic 218 during data transfers on the AGP/PCI bus 222.

The PCI/PCI bridge 220 is connected between the PCI bus 109 and the PCI data and control 208. The PCI/PCI bridge 220 allows existing enumeration code (unmodified) to recognize and handle AGP or PCI compliant devices residing on the AGP/PCI bus 222. The PCI/PCI bridge 220, for example, may be used in determining whether one or two AGP devices or a PCI device is connected to the AGP/PCI bus 222 by bus enumeration during POST.

The AGP/PCI logic 218 may function as a host/PCI bridge or the PCI/PCI bridge 220 may be used for PCI transactions on the AGP/PCI bus 222. In the first case (host/PCI bridge), the AGP/PCI logic 218 becomes a second host/PCI bridge and the AGP/PCI bus 222 becomes a second PCI/host bus in the computer system. The PCI bus 109 is the primary PCI bus and is assigned a logical PCI bus number of zero. The AGP/PCI bus 222 may be assigned a logical PCI bus number of one.

In the second case, the PCI/PCI bridge 220 may be used as a full function PCI/PCI bridge between the PCI bus 109 and the AGP/PCI bus 222 when transacting with a PCI device on the AGP/PCI bus 222. Transactions between the host bus 103 and the AGP/PCI bus 222 would have to go through both the host/PCI bridge 206 and the PCI/PCI bridge 220.

Figure 2A:
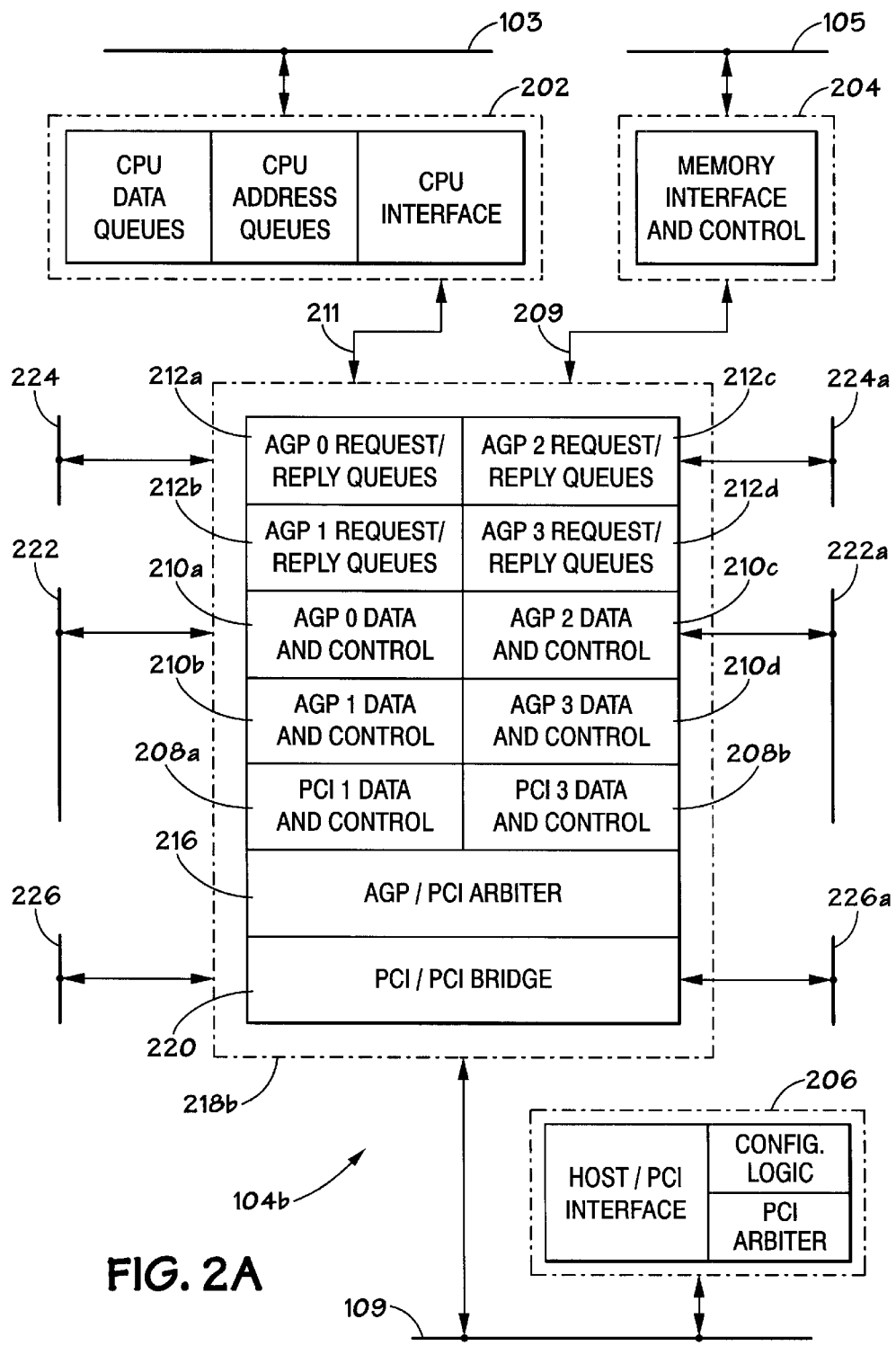
FIG. 2A is a schematic functional block diagram of another embodiment of the present invention according to the computer system of FIG. 1.

Two or more AGP buses may be implemented in the core logic chip set of the present invention. The AGP/PCI logic 218b illustrated in FIG. 2A is representative of dual AGP buses functionally similar to the AGP/PCI logic 218 illustrated in FIG. 2 and described above. AGP request and reply queues 212a–212d, AGP data and control 210a–210d, and AGP/PCI arbiter 216 enable the present invention to accommodate up to four AGP devices, or two AGP devices and two PCI devices.

Figure 3:
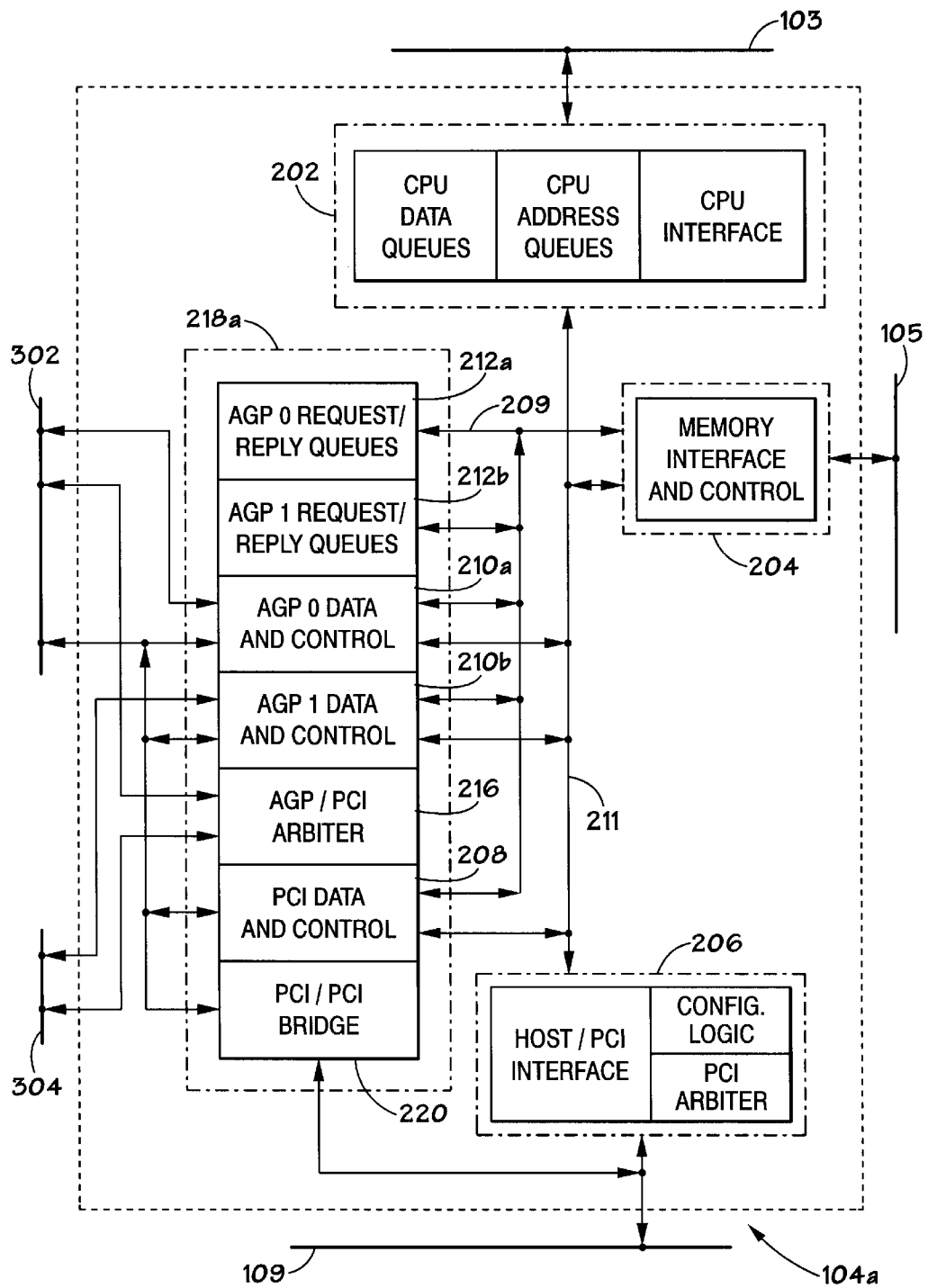
FIG. 3 is a schematic functional block diagram of yet another embodiment of the present invention according to the computer system of FIG. 1.

Referring now to FIG. 3, a schematic functional block diagram of the core logic 104a, according to another embodiment of the present invention, is illustrated. The core logic 104a functions substantially the same as the core logic 104 described above. Two independent AGP buses 302 and 304 are connected to the AGP/PCI logic 218a. One AGP device connector (see FIG. 8) is connected to each bus 302, 304. The AGP0 data and control 210a and the AGP0 request/reply queues 212a service the AGP device connected to the AGP bus 302. The AGP1 data and control 210b and the AGP1 request/reply queues 212b service the AGP device connected to the AGP bus 304. The AGP bus 302 may also service a PCI device through the PCI/PCI bridge 220. The AGP/PCI arbiter 216 has separate REQ# and GNT# lines for each AGP device or PCI device connected to either AGP bus 302, 304.

An advantage of the embodiment illustrated in FIG. 3 is that data transfers to both AGP devices may occur concurrently on both of the AGP buses 302, 304, whereas in the embodiment of FIG. 2 data transfers to only one AGP device at a time is possible because the AGP/PCI bus 222 (i.e., AD[31::0]) must be shared between the two AGP devices. Additionally, these two 32 bit wide data AGP buses 302, 304 may be adapted for connection to a 64 bit wide data PCI device as more fully described below. During POST and bus enumeration, the AGP buses 302, 304 may be connected together as one logical 32 bit bus with a bus switch 1002 (see FIG. 10) so that standard PCI bus enumeration may be used to find all of the AGP or PCI devices connected thereto.

Figure 3A:
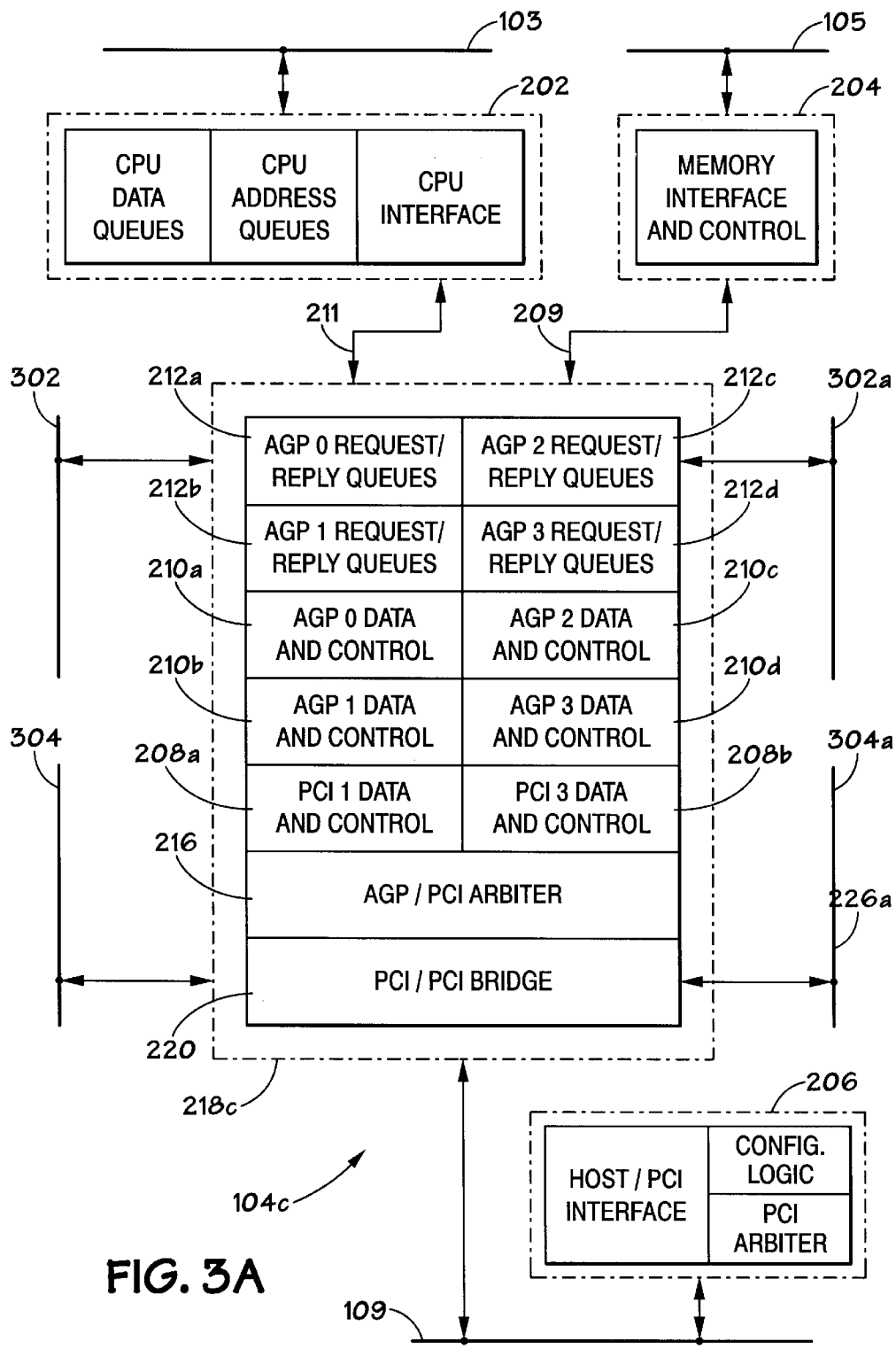
FIG. 3A is a schematic functional block diagram of still another embodiment of the present invention according to the computer system of FIG. 1.

Four or more AGP buses may be implemented in the core logic chip set of the present invention. The AGP/PCI logic 218c illustrated in FIG. 3A is representative of four independent AGP buses 302, 304, 302a, 304a. The AGP/PCI logic 218c is functionally similar to the AGP/PCI logic 218a illustrated in FIG. 3 and described above. AGP request and reply queues 212a–212d, AGP data and control 210a–210d, and AGP/PCI arbiter 216 enable the present invention to accommodate up to four AGP devices, or two AGP devices and two 64 bit PCI devices. The up to four AGP devices may perform transactions concurrently on the four independent AGP buses 302, 304, 302a, 304a.

Figure 4B:
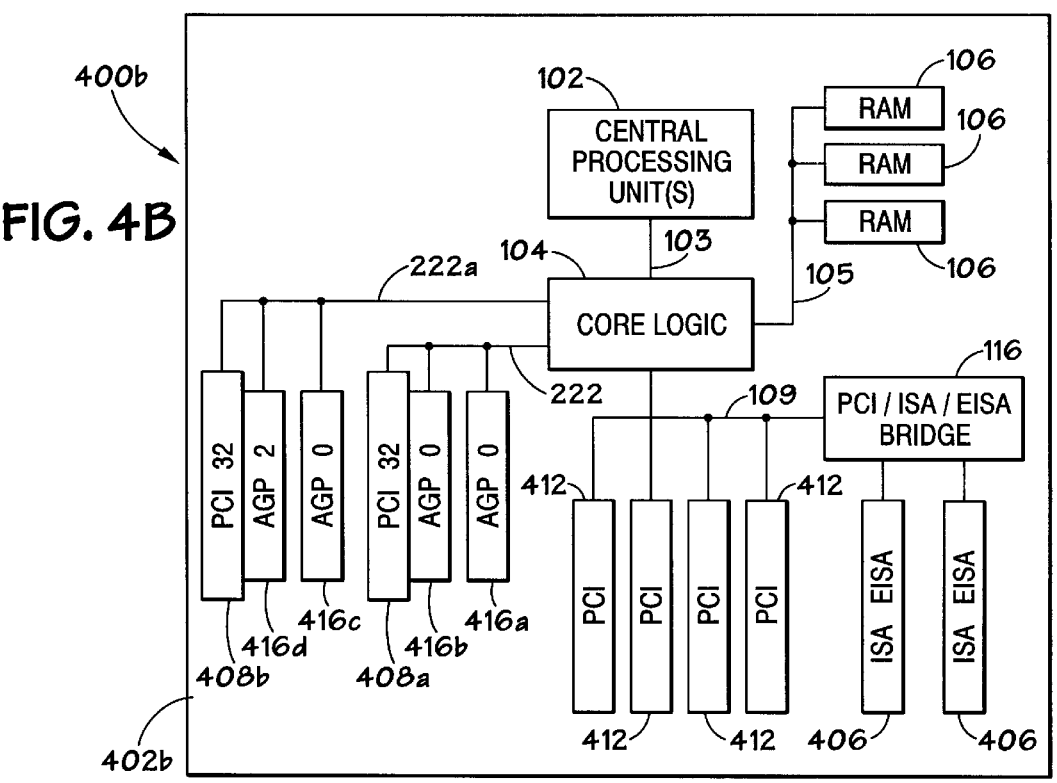
Figure 4C:
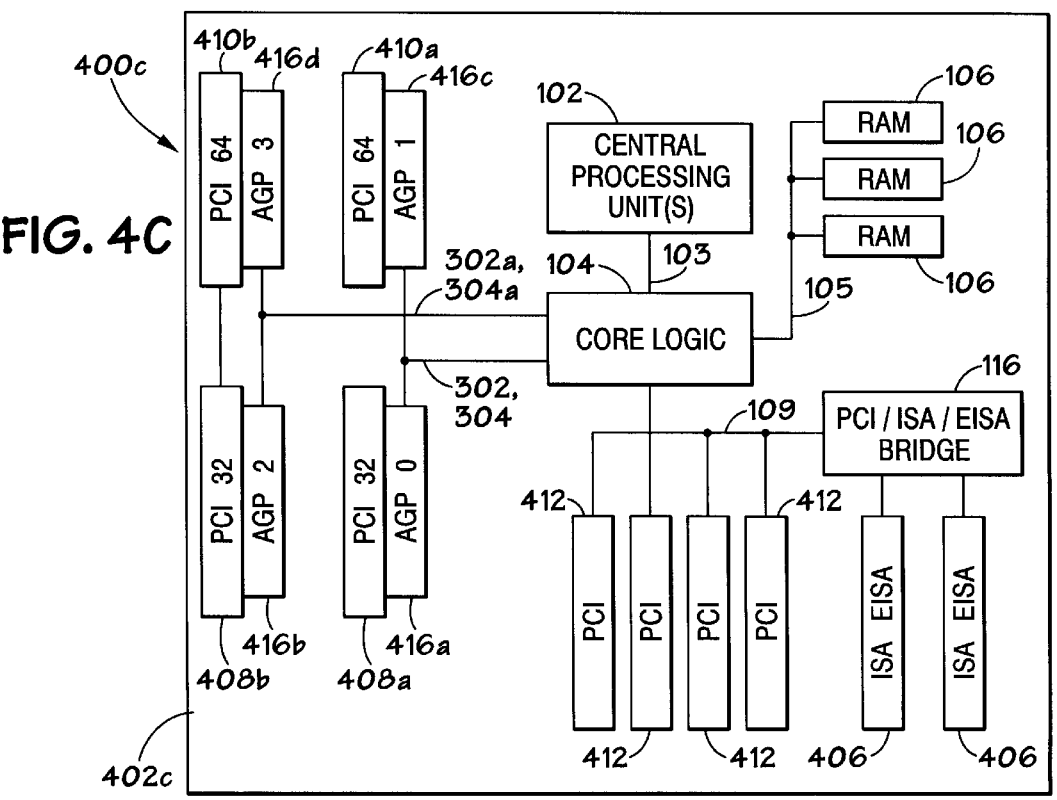

Referring to FIGS. 4, 4A, 4B and 4C, schematic block diagrams of computer system motherboards are illustrated in plan view. The computer system motherboards 400, 400a, 400b and 400c comprise printed circuit boards 402, 402a, 402b and 402c, respectively, on which components and peripheral card connectors are mounted thereto. The printed circuit boards 402, 402a, 402b and 402c comprise conductive printed wiring which is used to interconnect the components and connectors. The conductive printed wiring (illustrated as buses 103, 105 109, 222, 222a, 302, 304, 302a and 304a) may be arranged into signal buses having controlled impedance characteristics. On the printed circuit boards 402, 402a, 402b and 402c are the core logic 104, CPU(s) 102, RAM 106, PCI/ISA/EISA bridge 116, ISA/EISA connector(s) 406, 32 bit PCI connectors 412 (primary PCI bus 109), 32 bit PCI connector 408 (AGP/PCI bus 222), and AGP connectors 416a, 416b. The motherboard 402a (FIG. 4A) further comprises a 64 bit PCI bus extension connector 410. The PCI connectors 408, 410 may be deleted from the motherboard, leaving only the AGP connectors 416a, 416b. FIGS. 4B and 4C illustrate motherboards capable of handling up to four AGP devices.

Referring now to FIG. 5, a schematic functional block diagram of signal routing of an AGP 1×mode embodiment of the present invention is illustrated. The following signal names are more fully described in the AGP and PCI specifications disclosed above and which are incorporated by reference herein. Address and Data bus 502, AD[31::0], is a 32 bit bus having multiplexed address and data when doing PCI transactions, as more fully described in the PCI specification. The Address and Data bus 502 is connected to both of the AGP connectors 416a, 416b and is used to transfer data to each of the AGP devices (not illustrated) plugged into the AGP connectors 416a, 416b. The Address and Data bus 502 also is used to transfer addresses in the AGP PIPE addressing mode. Clock, CLK; Initiator Ready, IRDY#; Reset, RST#; System Error, SERR#; Target Ready, TRDY#; and Bus Command and Byte Enables, C/BE[3::0]# are interface and control signals connected to both of the AGP connectors 416a, 416b. Status bus, ST[2::0]; and Pipelined request, PIPE# are connected to both of the AGP connectors 416a, 416b. These signals comprise the common AGP/PCI bus 222 illustrated in FIG. 2 Signals which are connected only to the AGP connector 416a are: Request, REQ0#; Grant, GNT0#; Read Buffer Full, RBF0#; and Sideband Address port, SBA0[7::0] (bus 224 of FIG. 2). Signals which are connected only to the AGP connector 416b are: Request, REQ1#; Grant, GNT1#; Read Buffer Full, RBF1#; and Sideband Address port, SBA1[7::0] (bus 226 of FIG. 2).

In the AGP specification, the Sideband Address port (SBA[7::0]) is used to pass address and command information to the target (e.g., AGP/PCI logic 218) from the AGP master (e.g., video graphics controller 110). Having separate Sideband Address ports for each AGP device (plugged into slots 0 and 1), allows independent concurrent address requests of data for each AGP device. The AGP/PCI logic 218 has independent request/reply queues 212, and data and control 210 (FIG. 2) for each AGP device. These, request/reply queues 212, and data and control 210 in combination with the Sideband Address ports of each AGP device allow concurrent address prefetching of future data for each AGP device while present data is being transferred over the Address and Data bus 502 (AD[31::0]).

In the embodiment illustrated in FIG. 5, data may be transferred from the AGP/PCI logic 218 to only one of the AGP devices at a time because the Address and Data bus 502 signals are common to both of the AGP connectors 416a, 416b. Since all data signals for either AGP device appear at both connectors 416a, 416b, data for the intended AGP device must be indicated by its respective GNT# signal being asserted. Data for both of the AGP master devices is passed on the Address and Data bus 502, and the respective GNT# signal is used to indicate which data is for each of the AGP master devices. The RBF# signal is asserted only if the AGP master device cannot presently receive more data. The RBF# signal function is described in the AGP specification.

Figure 5A:
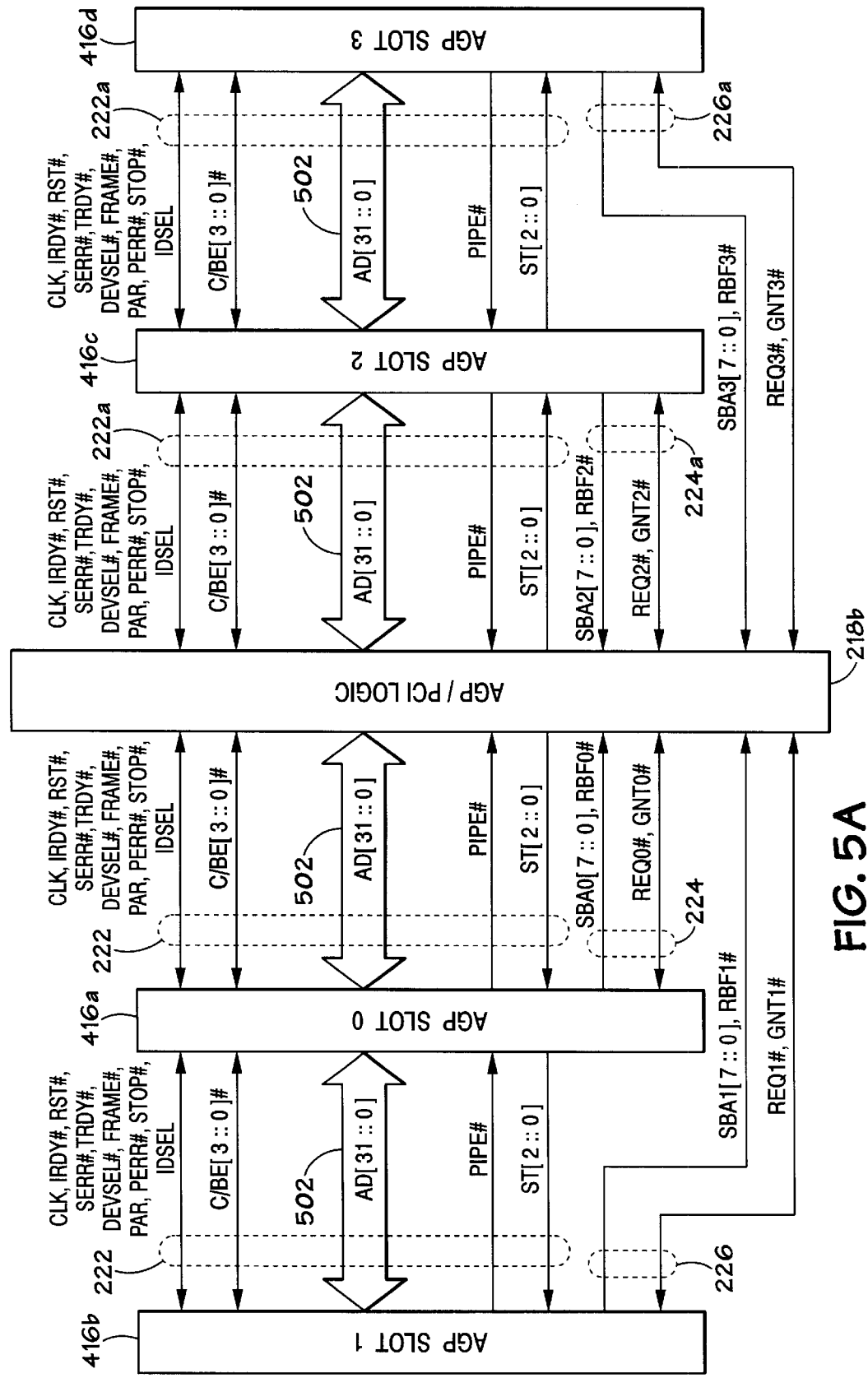
FIG. 5A is a schematic functional block diagram of signal routing of a four AGP connector embodiment of the present invention.

Referring to FIG. 5A, a schematic functional block diagram of another embodiment for up to four AGP devices is illustrated. This embodiment comprises two additional AGP connectors 416c and 416d connected to a second AGP bus 222a and is based on the embodiment of FIG. 5 and operates as disclosed above except for having twice the capacity thereof.

On a typical AGP connector, DBI_LO is assigned the pin B14 (reserved in AGP2.0 specification), and DBI_HI is assigned the pin A12 (used for PIPE# in AGP2.0 specification). The implication of using A12 for DBI_HI is that in designs that are "universal" and can operate in AGP2.0 or AGP3.0 modes, both the Master and Target must multiplex PIPE# and DBI_HI on the same wire. However, for a given mode of operation (AGP2.0 or AGP3.0), the meaning of this shared wire is fixed after power-up configuration. Such multiplexing is possible only because PIPE# is not used in AGP3.0, and DBI is not used in AGP2.0.

Table 1 shows the clock signals implemented in the AGP 2.0 Specification:

TABLE 1

| Name | Type | Description |
| --- | --- | --- |
| AD_STB0 | s/t/s (in/out) | AD Bus Strobe 0 provides timing for 2x data transfer mode on AD[15::00]. The agent that is providing data drives this signal. |
| AD_STB0# | s/t/s (in/out) | AD Bus Strobe 0 compliment and AD_STB0 provide timing for 4x data transfer mode on AD[15::00]. The agent that is providing data drives this signal. |
| AD_STB1 | s/t/s (in/out) | AD Bus Strobe 1 provides timing for 2x data transfer mode on AD[31::16]. The agent that is providing data drives this signal. |
| AD_STB1# | s/t/s (in/out) | AD Bus Strobe 1 compliment and AD_STB1 provide timing for 4x data transfer mode on AD[31::16]. The agent that is providing data drives this signal. |
| SB_STB | s/t/s (in) | SideBand Strobe provides timing for SBA[7::0] (when supported) and is always driven by the A.G.P. master. When the SideBand Strobes have been idle, a synch cycle needs to be performed before a request can be enqueued. (See Section 4.1.2.10 for details). |
| SB_STB# | s/t/s (in) | SideBand Strobe compliment and SB_STB# provide timing for SBA[7::0] (when supported) when 4x timing is supported and is always driven by the A.G.P. master. |
| CLK | t/s (out) | Clock provides timing for A.G.P. and PCI control signals. |

The primary difference between the AGP 2.0 and AGP 1.0 Specifications is the addition of AD_STB0# and AD_STB1# to support 4×transfer mode.

The correspondence of AGP signals between the AGP 2.0 Specification and the AGP 3.0 Specification are set forth in Table 2:

TABLE 2

| AGP2.0 Signal | AGP3.0 Signal | Signaling Scheme in AGP3.0 | Max Signaling Rate in AGP3.0 | Assertion Level In AGP3.0 |
| --- | --- | --- | --- | --- |
| SBA | SBA#1 | AGP3.0 signaling | 533MT/s/Source Synch | 1 = Low; 0 = High |
| SB_STB, SB_STB# | SB_STBF, SB_STBS | AGP3.0 Signaling | 266 MHz | 1 = High; 0 = Low |
| AD | AD | AGP3.0 Signaling | 533MT/s/Source Synch | 1 = High; 0 = Low |
| AD_STB[1:0], AD_STB#[1:0] | AD_STBF[1:0], AD_STBS[1:0] DBL_HI, DBL_LO | AGP3.0 Signaling | 266 MHz | 1 = High, 0 = Low |
| C/BE# | C#/BE | AGP3.0 Signaling | 533MT/s/Source Synch | C#: 1 = Low; 0 = High<br>BE: 1 = High; 0 = Low |
| ST, PAR | ST, PAR | AGP3.0 Signaling | 66 MHz/Common Clock | 1 = High; 0 = Low |

TABLE 2-continued

| AGP2.0 Signal | AGP3.0 Signal | Signaling Scheme in AGP3.0 | Max Signaling Rate in AGP3.0 | Assertion Level In AGP3.0 |
|---|---|---|---|---|
| FRAME#, TRDY#, IRDY#, STOP#, GNT#, DEVSEL#, PERR#, SERR#, REQ#, IDSEL, RBF#, WBF# | FRAME, TRDY, IRDY, STOP, GNT, DEVSEL, PERR, SERR, REQ, IDSEL; RBF, WBF | AGP3.0 Signaling | 66 MHz/Common Clock | 1 = High; 0 = Low |
| CLK | CLK | Same as AGP2.0 | 66 MHZ | Same as AGP |
| RST#, INTA#, INTB#, PME#, TYPEDET# | Same as AGP | Same as AGP2.0 | Asynch/Static | Same as AGP |

The following Table 3 shows signals that are new and redefined in the transition from AGP 2.0 to AGP:

TABLE 3

| Name | Type of Change | Type | Description |
|---|---|---|---|
| AGP_Vrefcg | Redefined | Static | This pin is used by the motherboard (or core-logic) to supply AGP Vref or AGP3.0 Vref to the graphics card based on the configuration detected. |
| AGP_Vrefgc | Redefined | Static | This pin is used by the Graphics Card to supply AGP or AGP3.0 Vref to the motherboard based on the configuration detected. |
| GC_DET# | New | Static | This is pulled down to Vss by the AGP3.0 or Universal AGP3.0 Graphics Card. AGP Graphics Cards will leave this signal unconnected. The motherboard usage of this pin is implementation specific This signal uses a currently "reserved" pin on the AGP connector. |
| MB_DET# | New | Static | This is pulled down to Vss by the AGP3.0 or Universal AGP3.0 motherboard. The graphics card usage of this pin is implementation specific. This signal uses a currently "reserved" pin on the AGP connector. |
| DBI_HI | New | Source Synchronous | This is a bit that goes along with AD[31:16] to indicate whether AD[31:16] needs to be inverted on the receiving end. DBI_HI = 0 AD[31:16] is not inverted, so receiver may use as is. DBI_HI = 1 AD[31:16] is inverted, so receiver must invert before use. On the AGP connector, DBI_HI is multiplexed with the signal. PIPE#, which is not used in AGP3.0. |
| DBI_LO | New | Source Synchronous | This is a bit that goes along with AD[15:00] to indicate whether AD[15:00] needs to be inverted on the receiving end. DBI_LO = 0 AD [15:00] is not inverted, so receiver may use as is. DBI_LO = 1 AD [15:00] is inverted, so receiver must invert before use. This signal uses a currently "reserved" pin on the AGP connector. |

Figure 6:
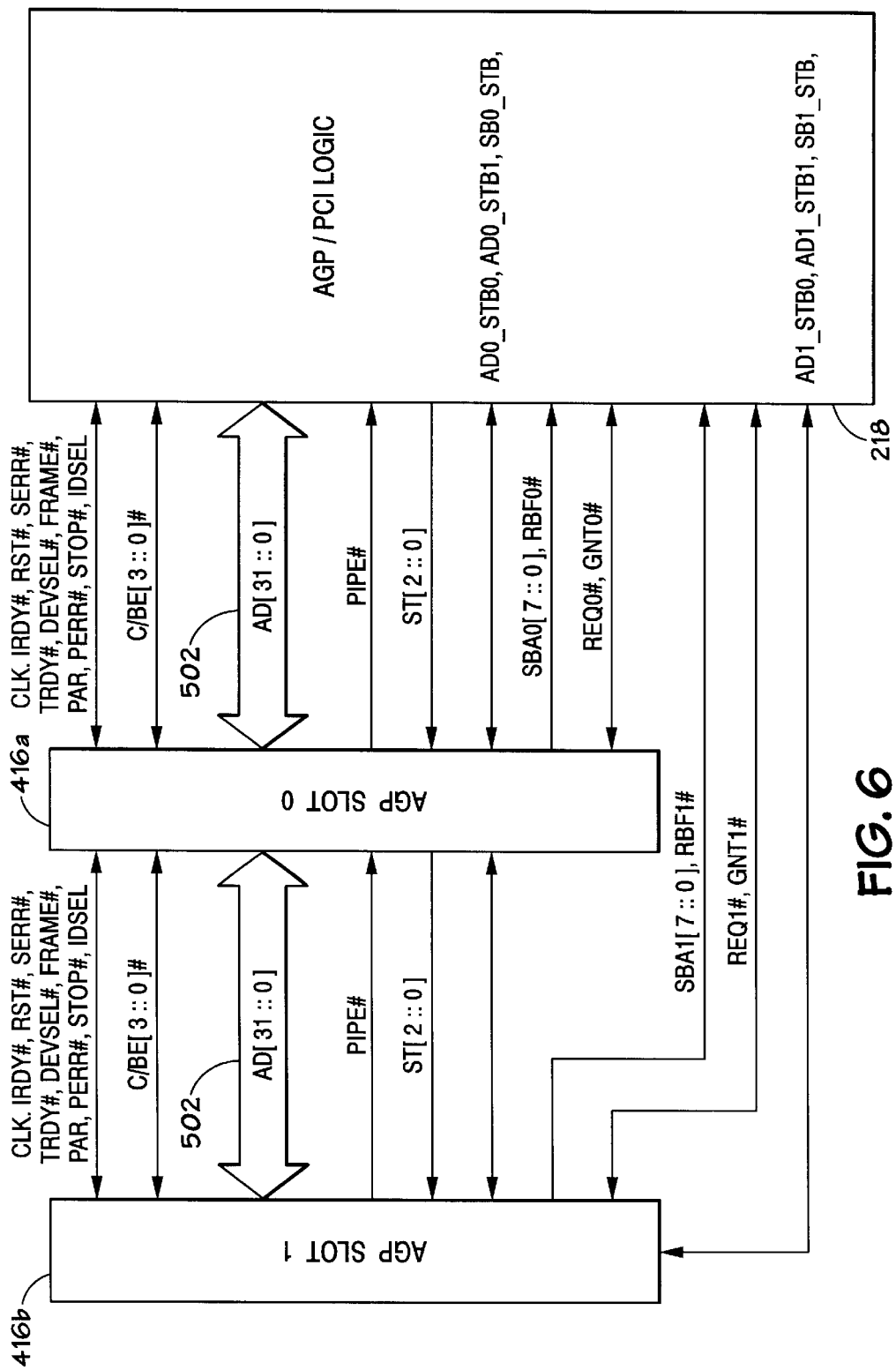
FIG. 6 is a schematic functional block diagram of signal routing of another two AGP connector embodiment of the present invention.

Referring now to FIG. 6, a schematic functional block diagram of signal routing of an AGP 2×mode embodiment of the present invention is illustrated. In AGP 2×mode, additional strobe signals AD_STB0, AD_STB1, and SB_STB are required. These strobe signals enable data transfers at 133 MHz on the Address and Data bus 502, AD[31::0], and Sideband Addressing on the sideband address bus, SBA[7::0]. Strobe signals AD0_STB0, AD0_STB1, and SB0_STB may be connected between the AGP/PCI logic 218 and the AGP connector 416a. Strobe signals AD1_STB0, AD1_STB1, and SB1_STB may be connected between the AGP/PCI logic 218 and the AGP connector 416b. Individual strobe signals for each AGP connector may be used in the preferred embodiment of the present invention, or common strobe signals may be shared between the AGP connectors 416a, 416b so long as all timing constraints are satisfied, as defined in the AGP Specification.

Figure 6A:
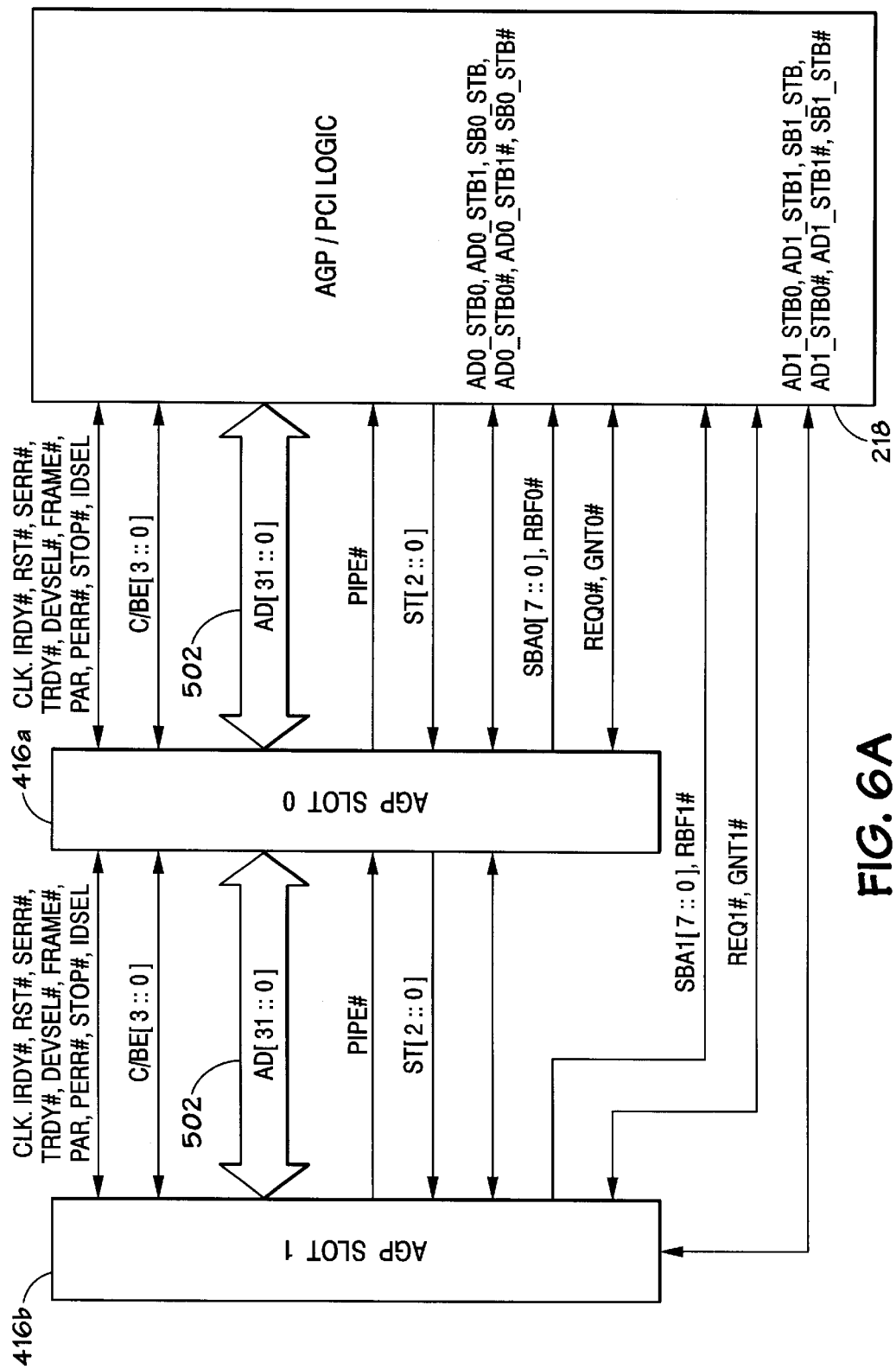
FIG. 6A is a schematic functional block diagram of signal routing of still another two AGP connector embodiment of the present invention.

FIG. 6A shows a configuration of the embodiment shown in FIG. 6 adapted for 4×transfer according to the AGP 2.0 Specification.

Figure 6B:
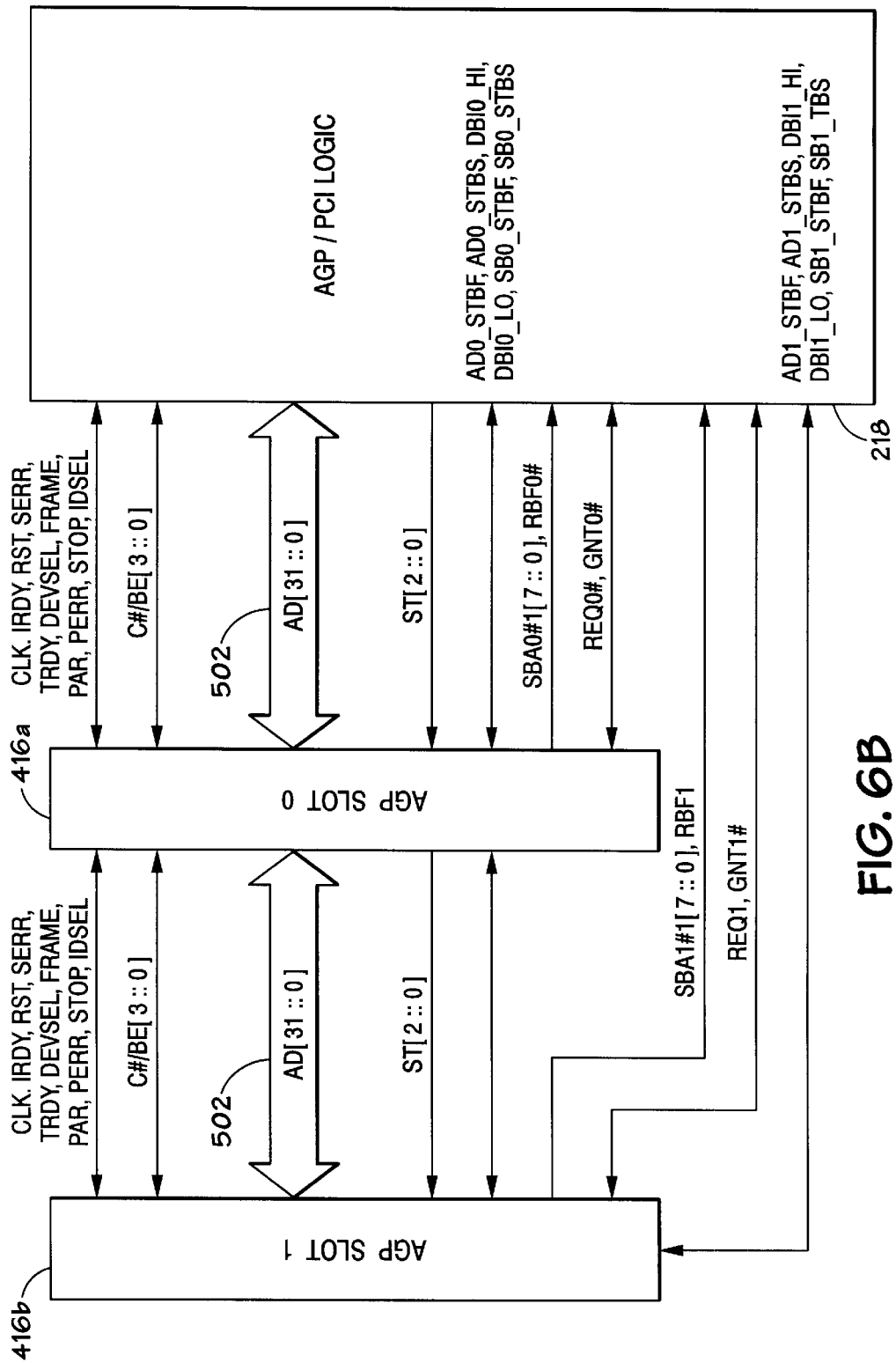
FIG. 6B is a schematic functional block diagram of signal routing of yet another two AGP connector embodiment of the present invention.

FIG. 6B shows a configuration of the embodiment shown in FIG. 6 adapted for 8×transfer according to the AGP 3.0 Specification.

Figure 7:
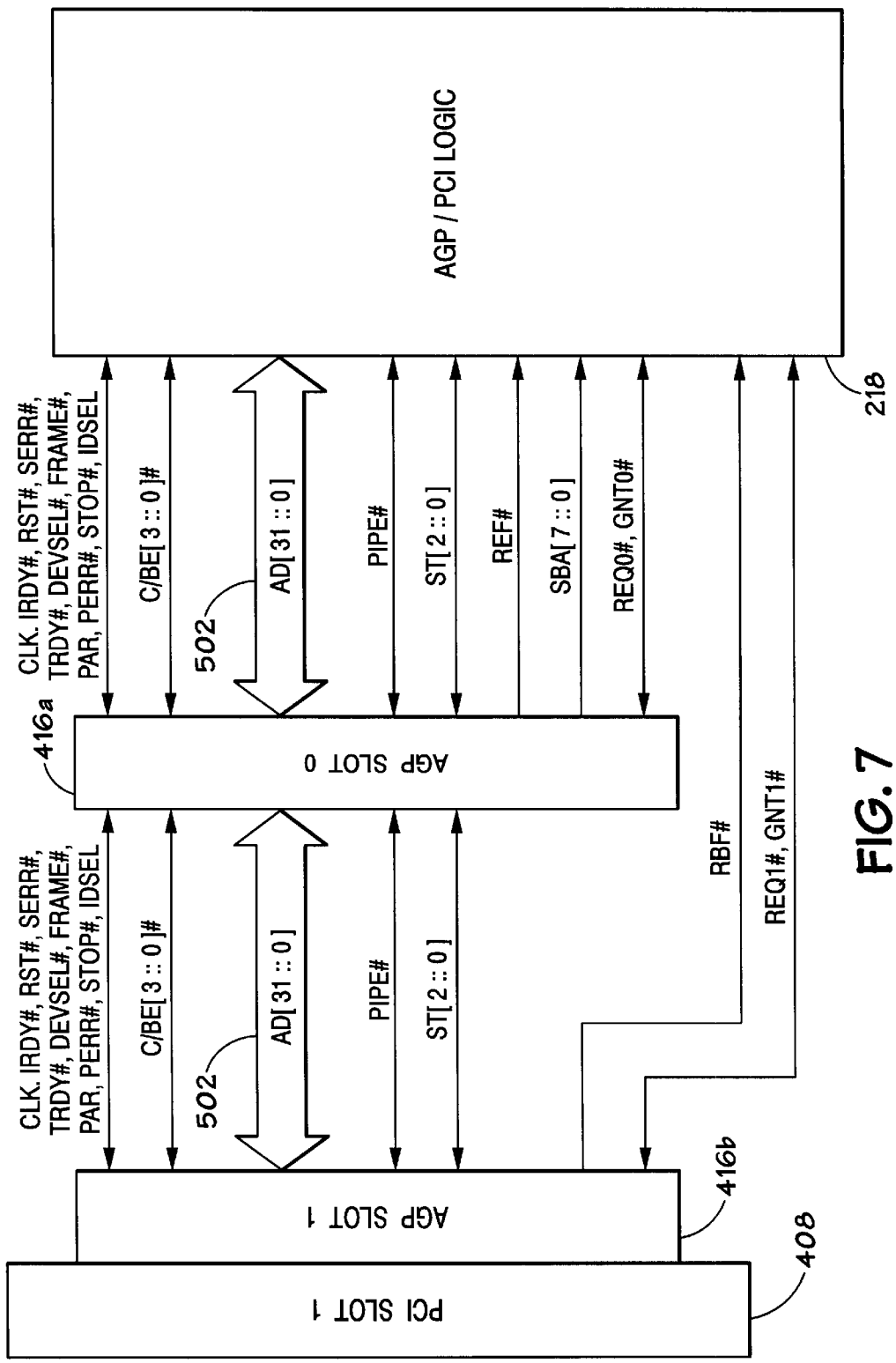
FIG. 7 is a schematic functional block diagram of signal routing of a combination of a two AGP connector, or an AGP connector and a PCI connector embodiment of the present invention.

Referring to FIG. 7, a schematic functional block diagram of signal routing of the embodiment first disclosed above in FIG. 5 is now illustrated with an additional PCI connector 408. The PCI connector 408 may be proximate to the AGP connector 416b (see FIG. 4) and the AGP/PCI signals are bussed together between these two connectors. The configuration illustrated in FIG. 7 allows the present invention to interface with either two AGP devices plugged into the AGP connectors 416a, 416b, or one AGP device in AGP connector 416a and one PCI device plugged into the PCI connector 408. Thus, an AGP or PCI data transaction may occur on the Address and Data bus 502 depending on which device is selected by its respective GNT# signal. Only one device card may be plugged into the slot 1 connectors, a PCI device card into the PCI connector 408 or an AGP device card into the AGP connector 416b, but not both at the same time. An AGP card is normally plugged into the AGP connector 416a, however, the present invention may properly function when only one device card plugged into a connector.

Figure 7A:
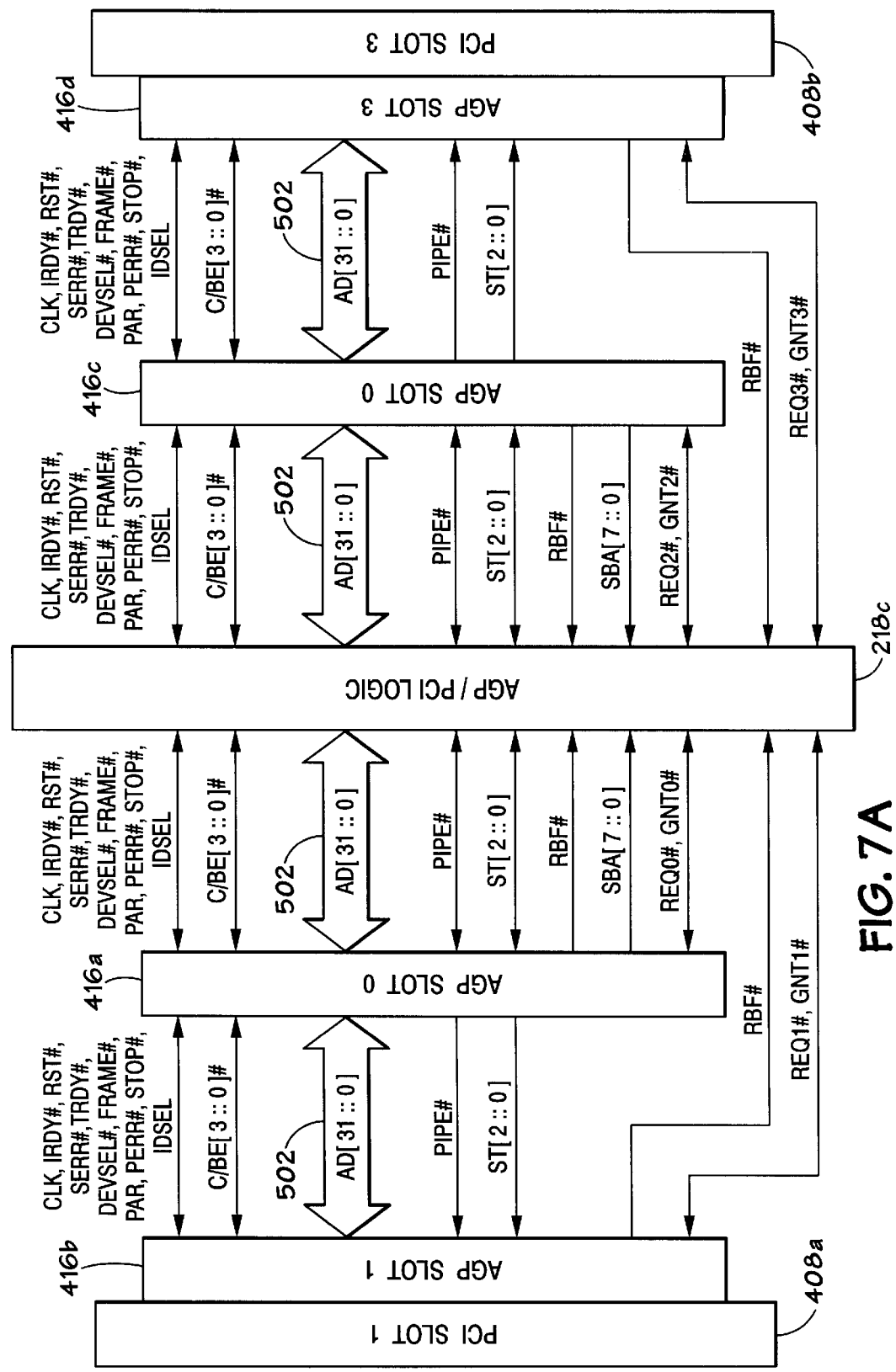
FIG. 7A is a schematic functional block diagram of signal routing of a combination of a four AGP connector, or a two AGP connector and a two PCI connector embodiment of the present invention.

Referring to FIG. 7A, a schematic functional block diagram of another embodiment for up to four AGP devices or two AGP devices and two PCI devices is illustrated. This embodiment comprises two AGP connectors 416c and 416d, and two PCI connector 408a and 408b connected to two AGP/PCI buses. The embodiment of FIG. 7A is based on the embodiment of FIG. 7 and operates as disclosed above except for having twice the capacity thereof.

Figure 8:
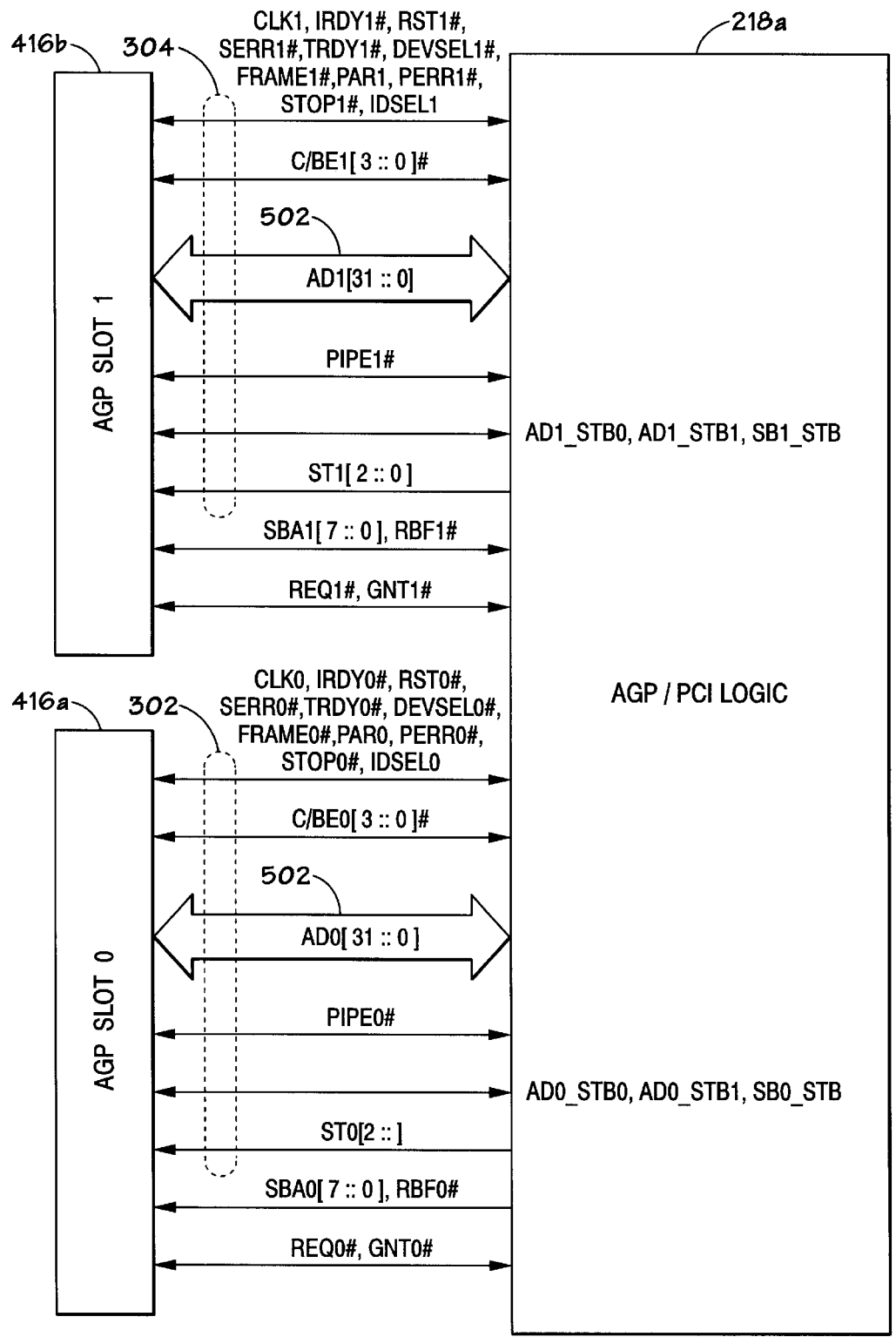
FIG. 8 is a schematic functional block diagram of signal routing of yet another two AGP connector embodiment of the present invention.

Referring now to FIG. 8, a schematic block diagram of another embodiment of the present invention is illustrated. All control, address and data signals are grouped into separate and independent buses 302 and 304 (see FIG. 3) and connect to the AGP connectors 416a and 416b, respectively. The AGP0 request/reply queues 212a, and AGP0 data and control 210a (see FIG. 3) are connected exclusively to the AGP connector 416a. Similarly, the AGP1 request/reply queues 212b, and AGP1 data and control 210b are connected exclusively to the AGP connector 416b. The AGP/PCI arbiter 216 allows independent concurrent transactions between each AGP device and the AGP/PCI logic 218a. This embodiment is also capable of AGP 2×mode operation by utilizing Strobe signals AD0_STB0, AD0_STB1, and SB0_STB connected between the AGP/PCI logic 218a and the AGP connector 416a; and Strobe signals AD1_STB0, AD1_STB1, and SB1_STB connected between the AGP/PCI logic 218a and the AGP connector 416b. Individual strobe signals may be utilized as required by loading and timing constraints.

Figure 8A:
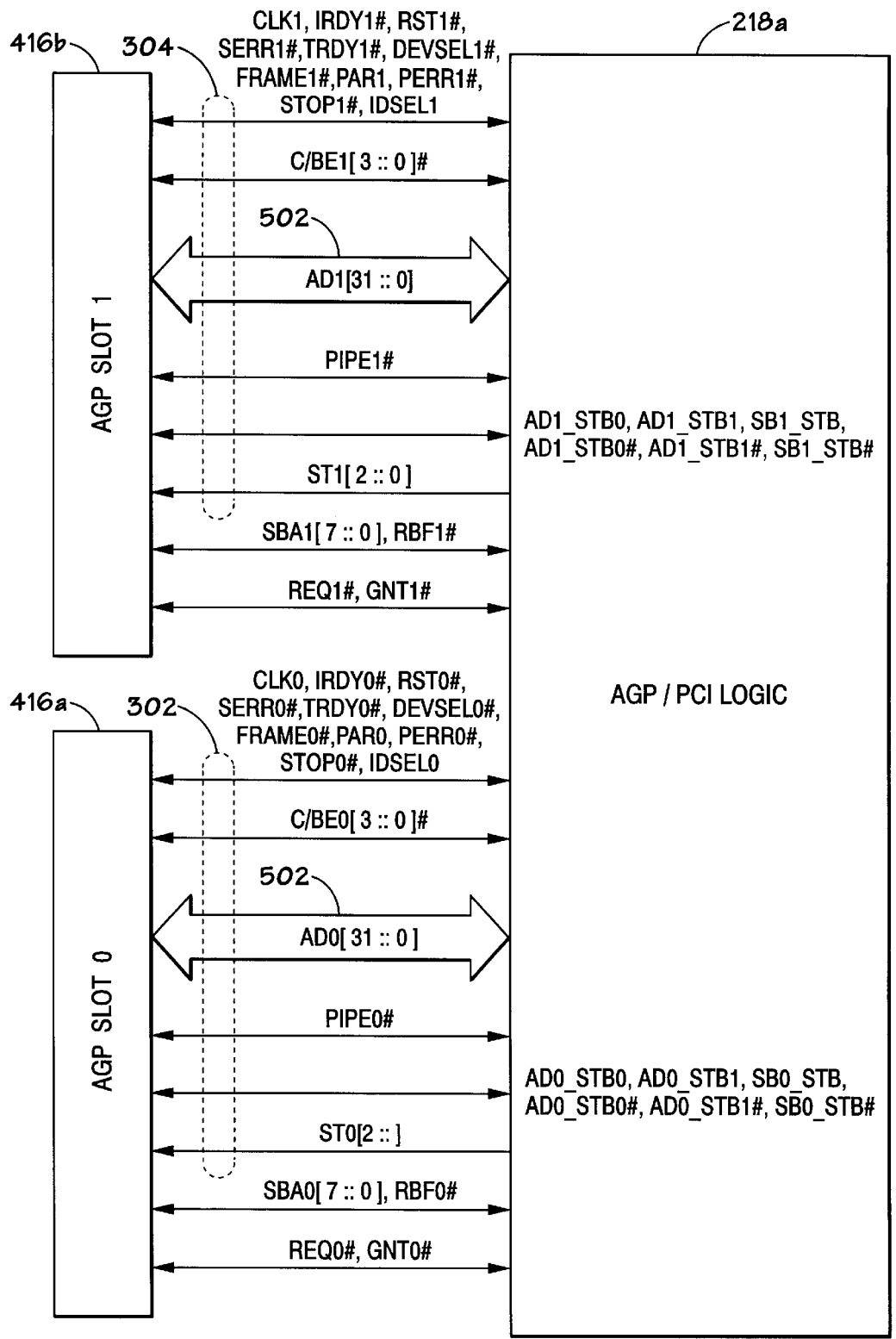
FIG. 8A is a schematic functional block diagram of signal routing of still another two AGP connector embodiment of the present invention.

FIG. 8A shows a configuration of the embodiment shown in FIG. 8 adapted for 4×transfer according to the AGP 2.0 Specification.

Figure 8B:
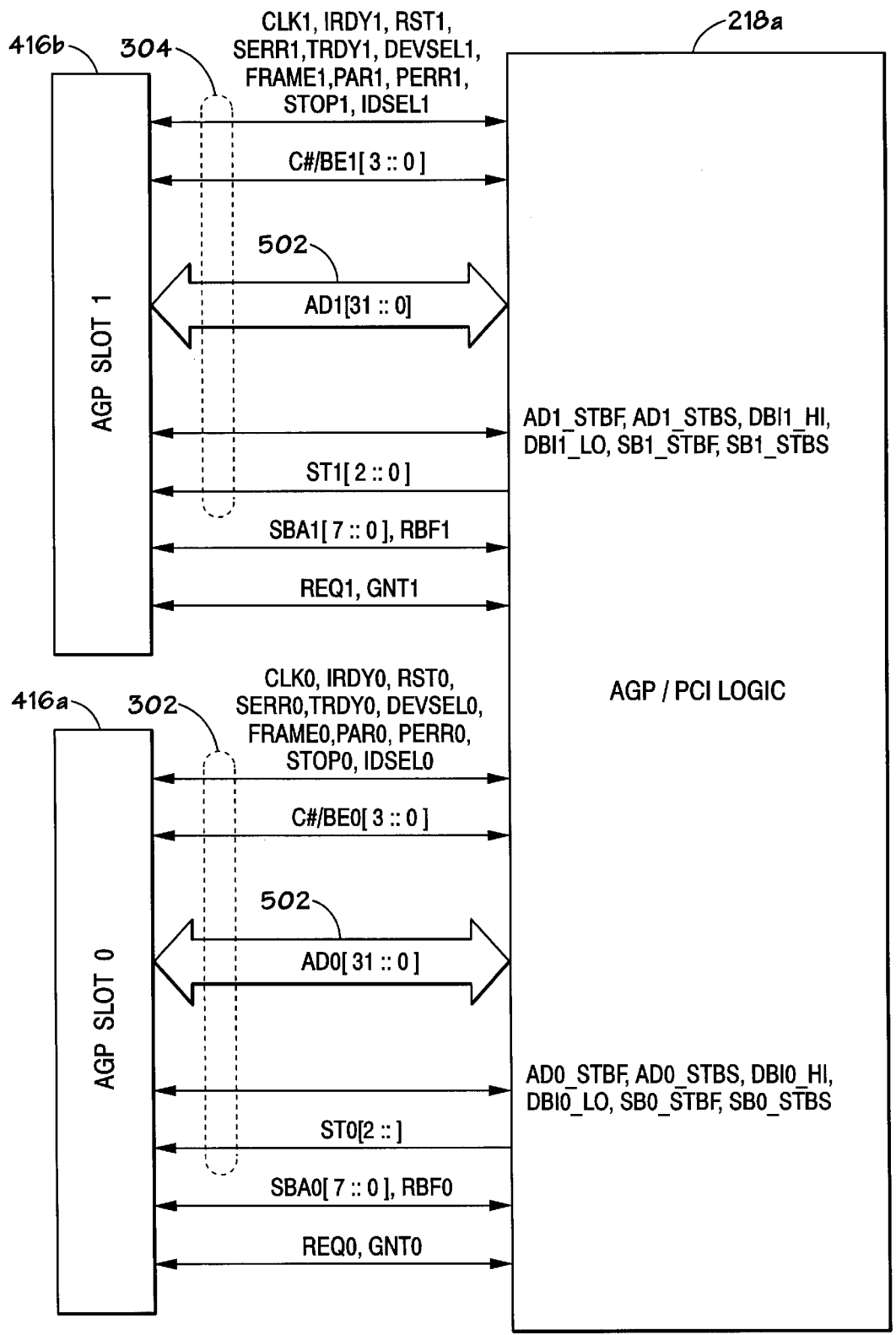
FIG. 8B is a schematic functional block diagram of signal routing of yet another two AGP connector embodiment of the present invention.

FIG. 8B shows a configuration of the embodiment shown in FIG. 8 adapted for 8×transfer according to the AGP 3.0 Specification.

Figure 9:
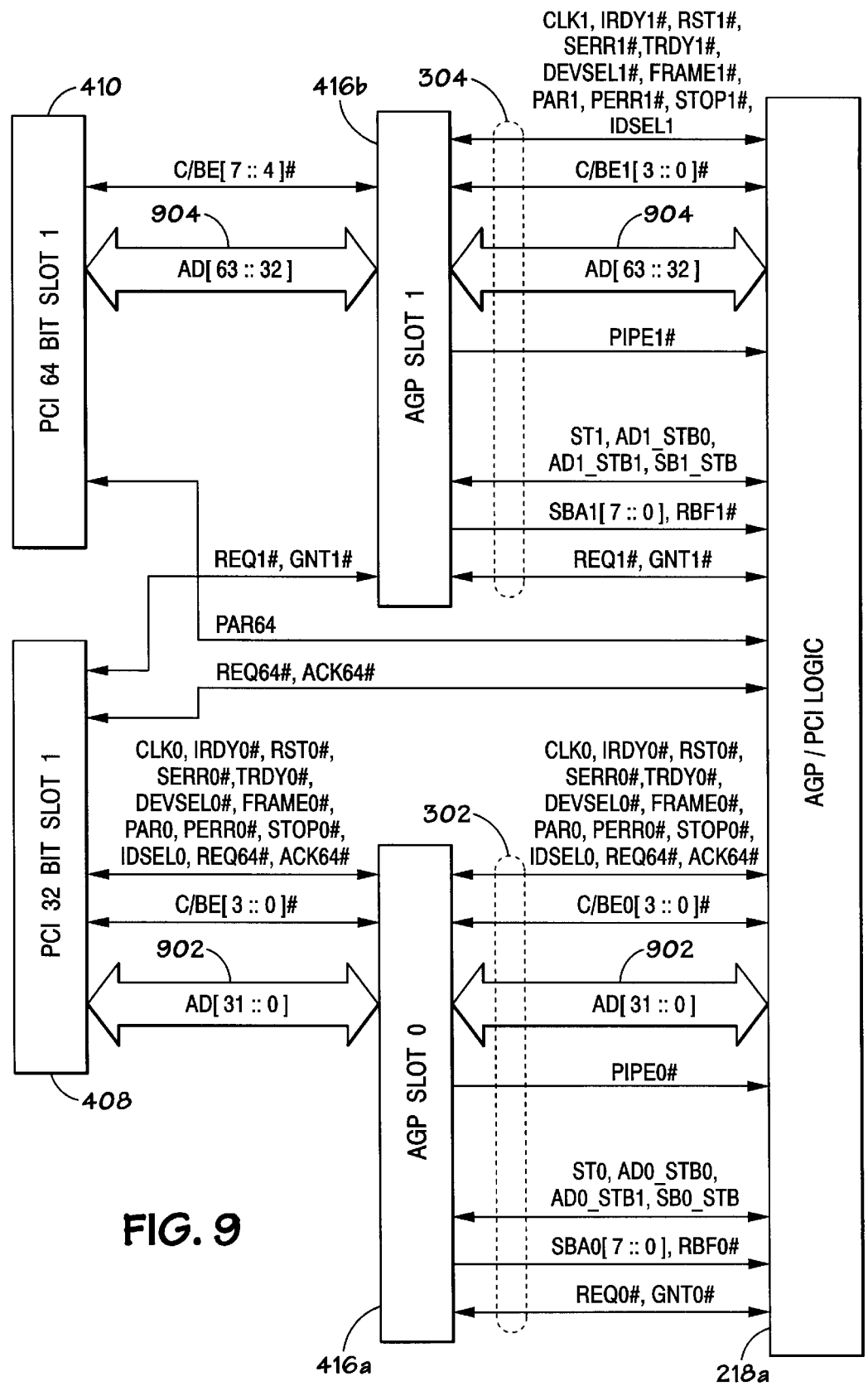
FIGS. 9 and 9A–9E are schematic functional block diagrams of signal routing of still another AGP and PCI connector embodiment of the present invention.

Referring now to FIG. 9, a schematic block diagram of a further embodiment of the present invention disclosed above in FIG. 8 is illustrated with additional PCI connectors 408, 410 (see FIG. 4A). Since the embodiment of FIG. 8 has two independent 32 bit Data and Address buses, these two buses may be combined to form a 64 bit PCI bus as more fully defined in the PCI 2.1 Specification referenced above. A 32 bit Address and Data bus 902, AD[31::0], is connected to the AGP connector 416a and the PCI connector 408 (see FIG. 4). Another Address and Data bus 904, AD[63::32], is connected to the AGP connector 416b and the PCI connector 410 (see FIG. 4A). Additional PCI signals for 64 bit operation are connected between the PCI connectors 408, 410 and the AGP/PCI logic 218a. These signals are: Request 64 bit Transfer, REQ64# and Acknowledge 64 bit Transfer, ACK64# to the PCI connector 408, and Byte Enables, C/BE[7::4]# and Parity for the upper 32 bits, PAR64# to the PCI connector 410. C/BE1[3::0]# to the AGP connector 416b may be reused for C/BE[7::4]# to the 64 bit PCI connector 410. Request 1, REQ1# and Grant 1, GNT1# are used for either a second AGP device plugged into the AGP connector 416b or a 32 (64) bit PCI device plugged into the PCI connector(s) 408 (408, 410).

Figure 9A:
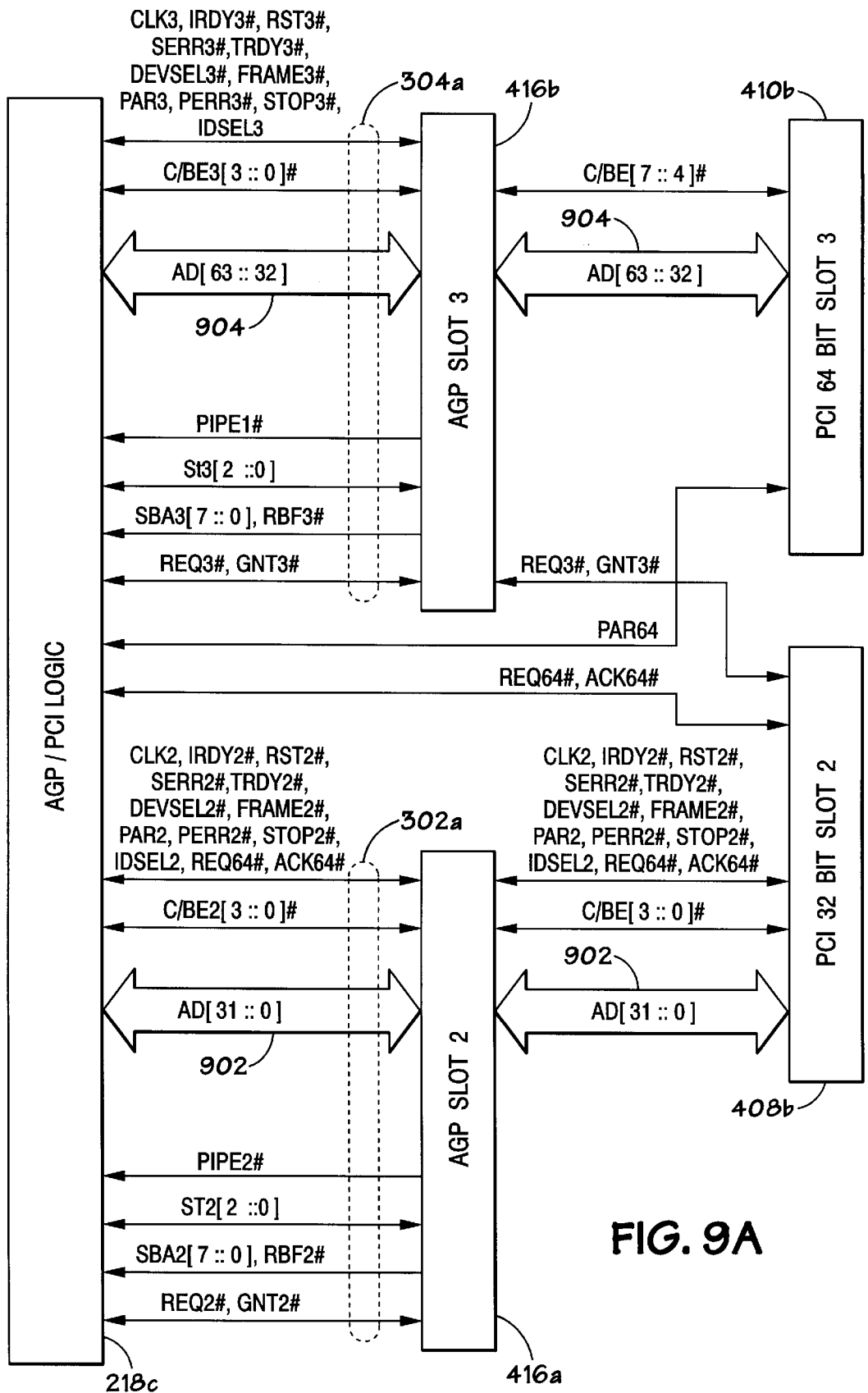
Figure 9B:
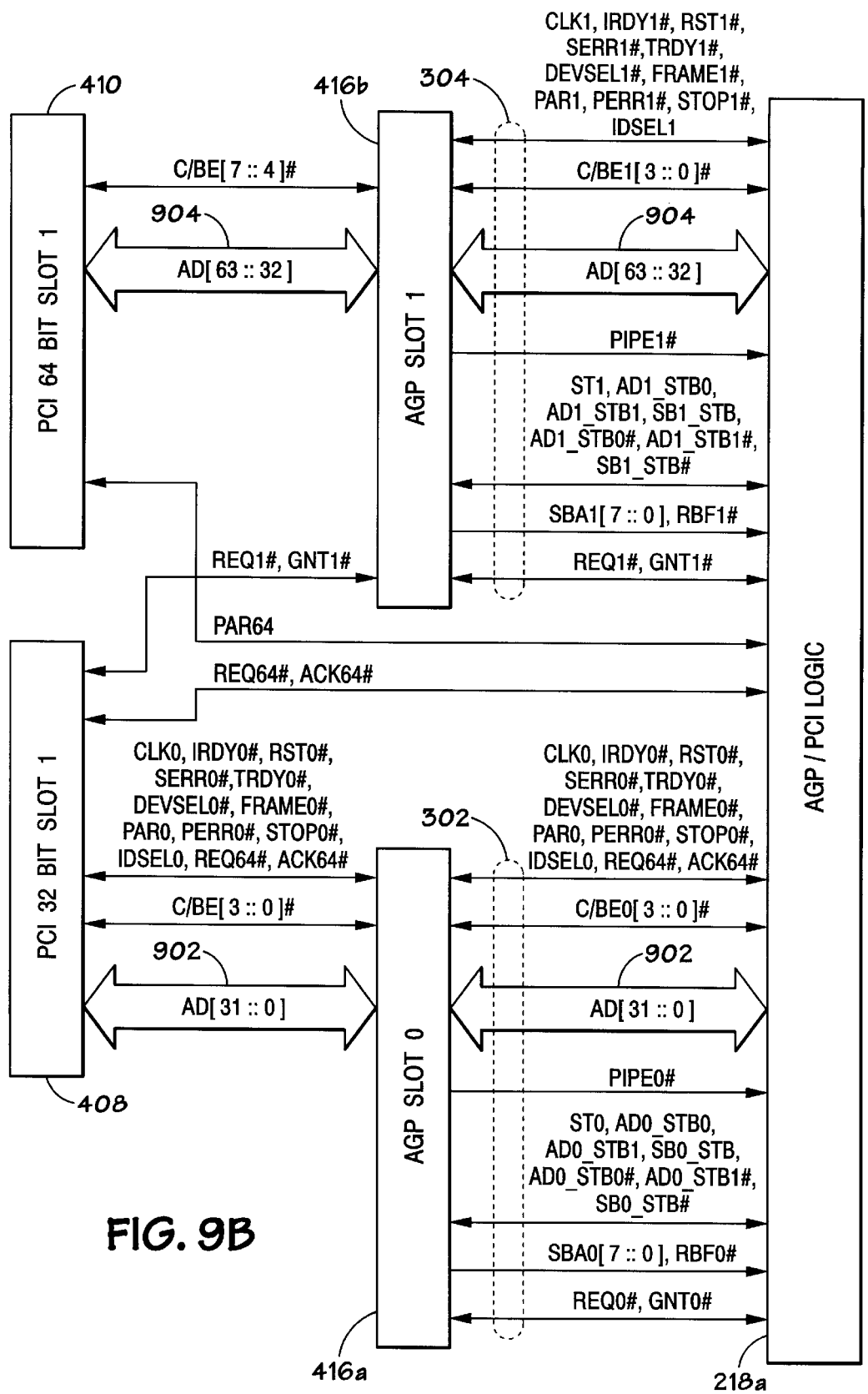
Figure 9C:
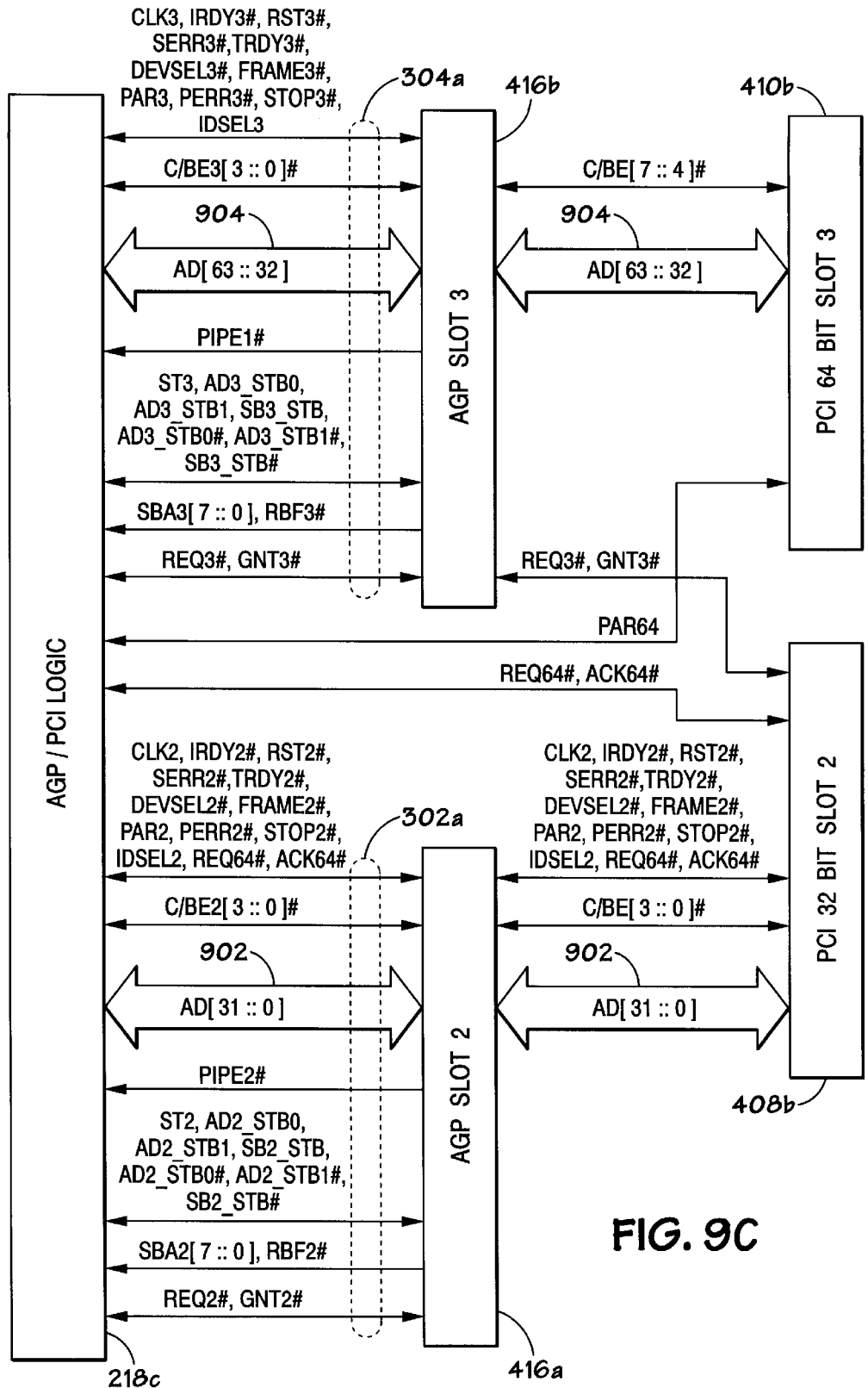
Figure 9D:
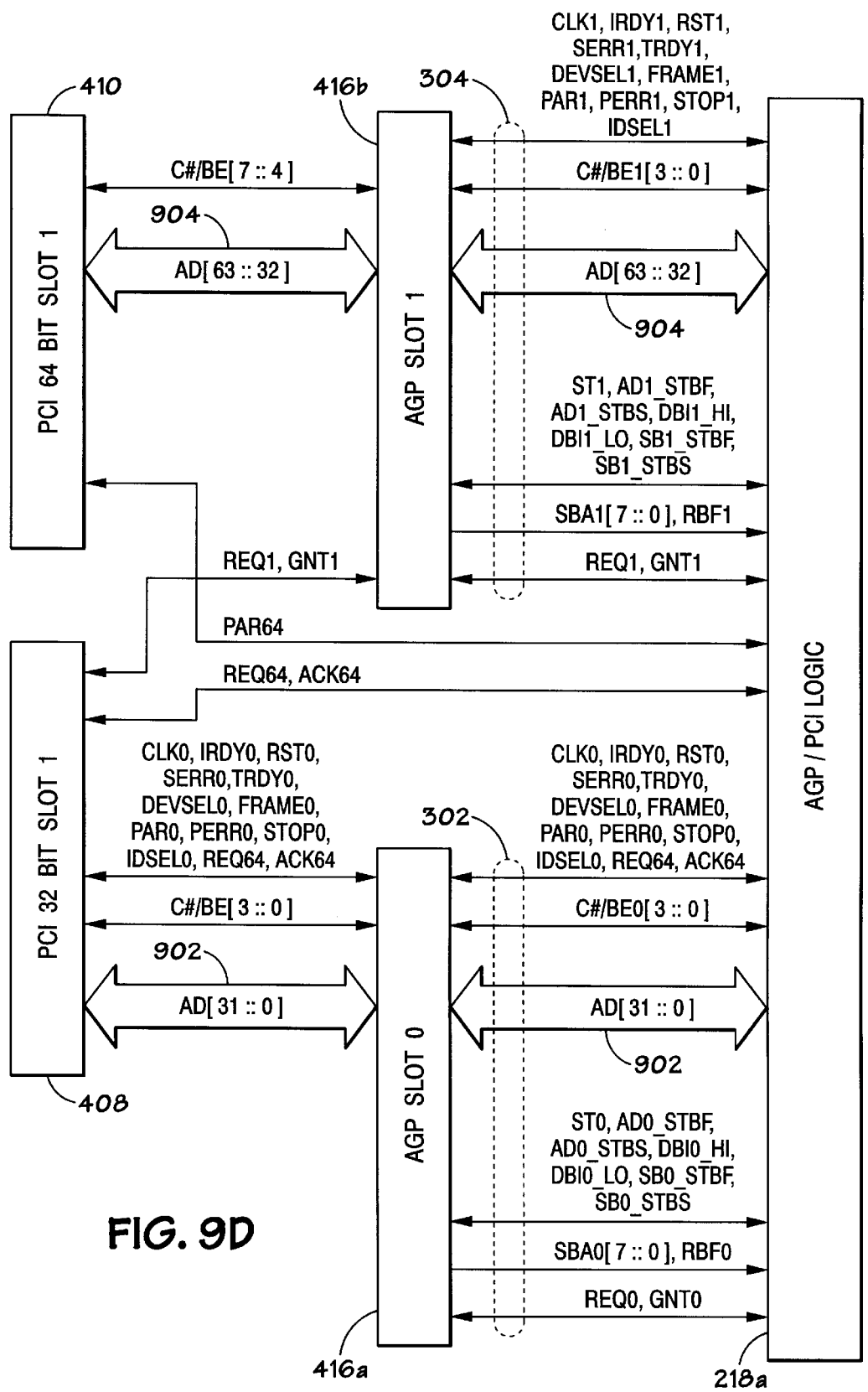
Figure 9E:
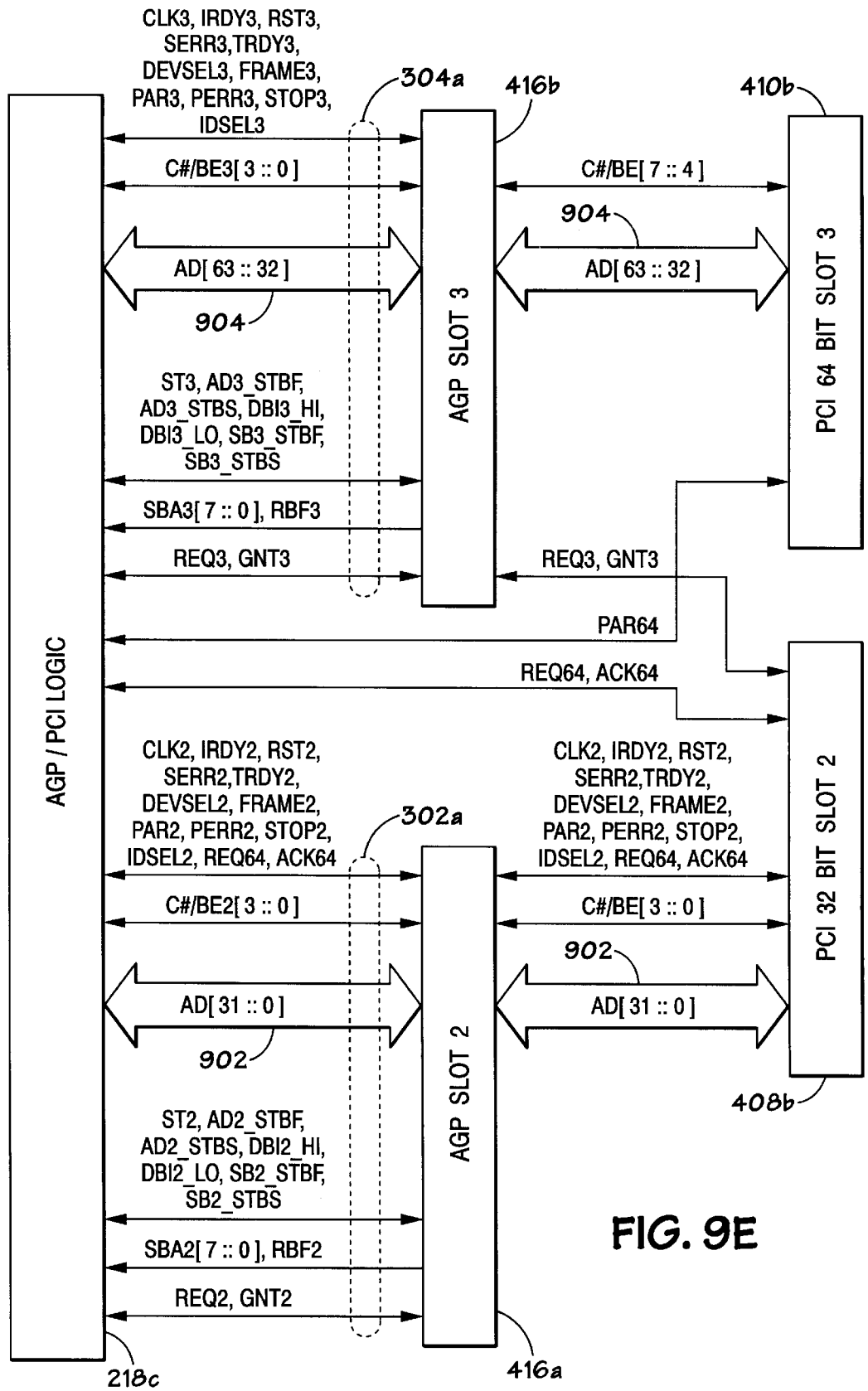

The configuration illustrated in FIG. 9 allows the present invention to interface with either two AGP devices plugged into the AGP connectors 416a, 416b, or one AGP device plugged into AGP connector 416a and one 64 bit PCI device plugged into the PCI connectors 408, 410. A 32-bit PCI device card may also be plugged into the PCI connector 408. Registered PCI is also contemplated in the present invention. The device handling capacity of the embodiment of FIG. 9 may be doubled, tripled or quadrupled by adding more AGP/PCI bus pairs to the AGP/PCI logic, as illustrated in FIG. 9A (also see FIGS. 5A and 7A).

As disclosed above in the description of the embodiment illustrated in FIG. 8, two AGP devices may have data transactions occurring concurrently on the separate and independent buses 302 and 304. However, when a 64 bit PCI device is connected to the Address and Data buses 902 and 904, logical AD[63::0], transactions between the 64 bit PCI device and the AGP/PCI logic 218a cannot occur during transactions between the AGP device plugged into the AGP connector 416a and the AGP/PCI logic 218a because common Address and Data bus 902 must be used for both devices. It also contemplated in the invention that either an AGP device will be plugged into the AGP connector 416b or a PCI device will be plugged into the PCI connectors 408, 410, but not both AGP and PCI devices will be plugged in at the same time. An AGP card is normally plugged into the AGP connector 416a, however, the present invention may properly function when only one AGP or PCI device card is plugged into either connector(s) 416b (AGP device), 408 (32 bit PCI device, or 408 and 410 (64 bit PCI device). AGP or PCI data transactions may occur on the Address and Data buses 902 and 904 depending on which device is selected by its respective GNT# signal.

Figure 10:
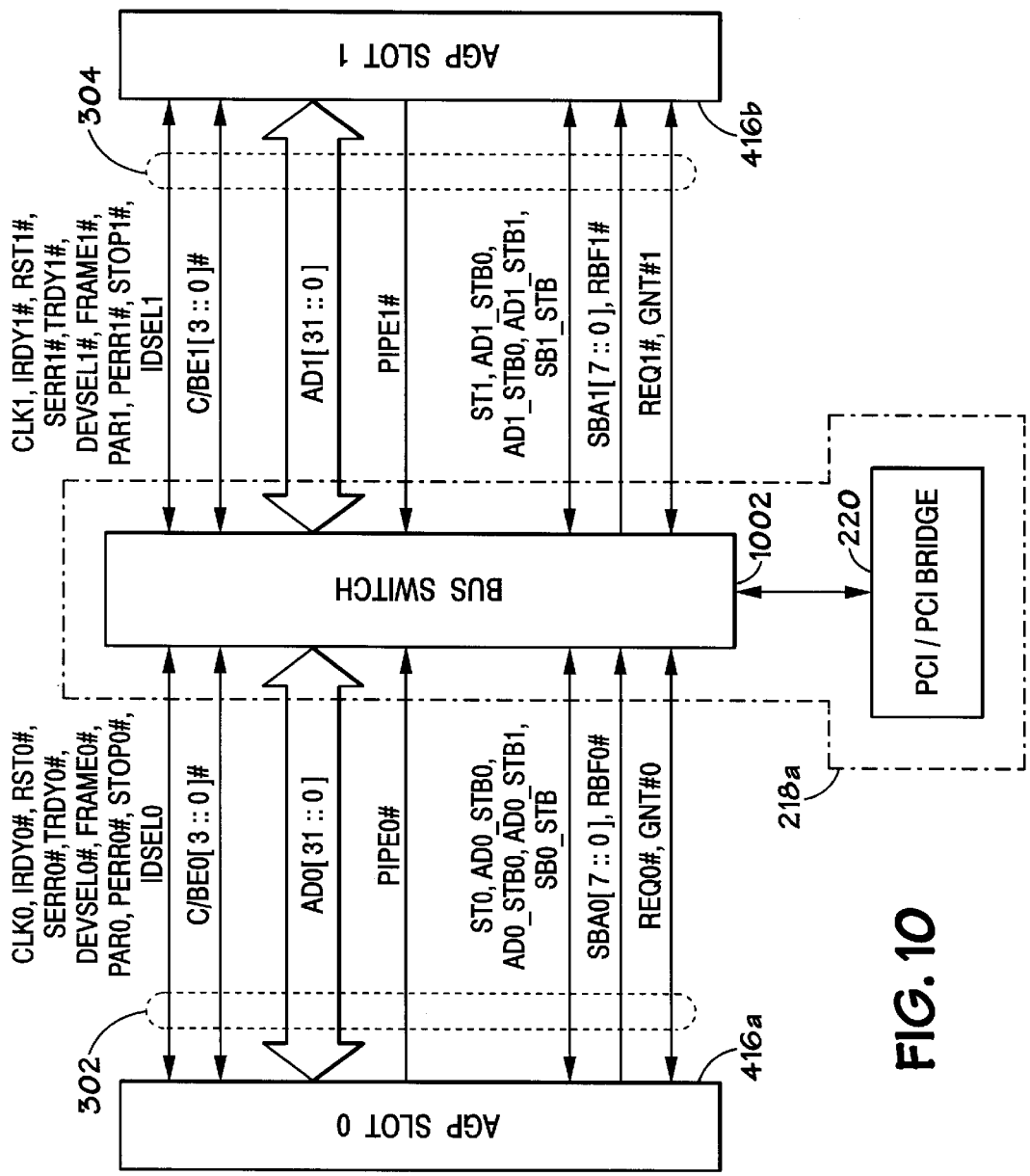
FIGS. 10, 10A and 10B are a schematic functional block diagram of a portion of the embodiments of the present invention according to FIGS. 8 and 9.
Figure 10A:
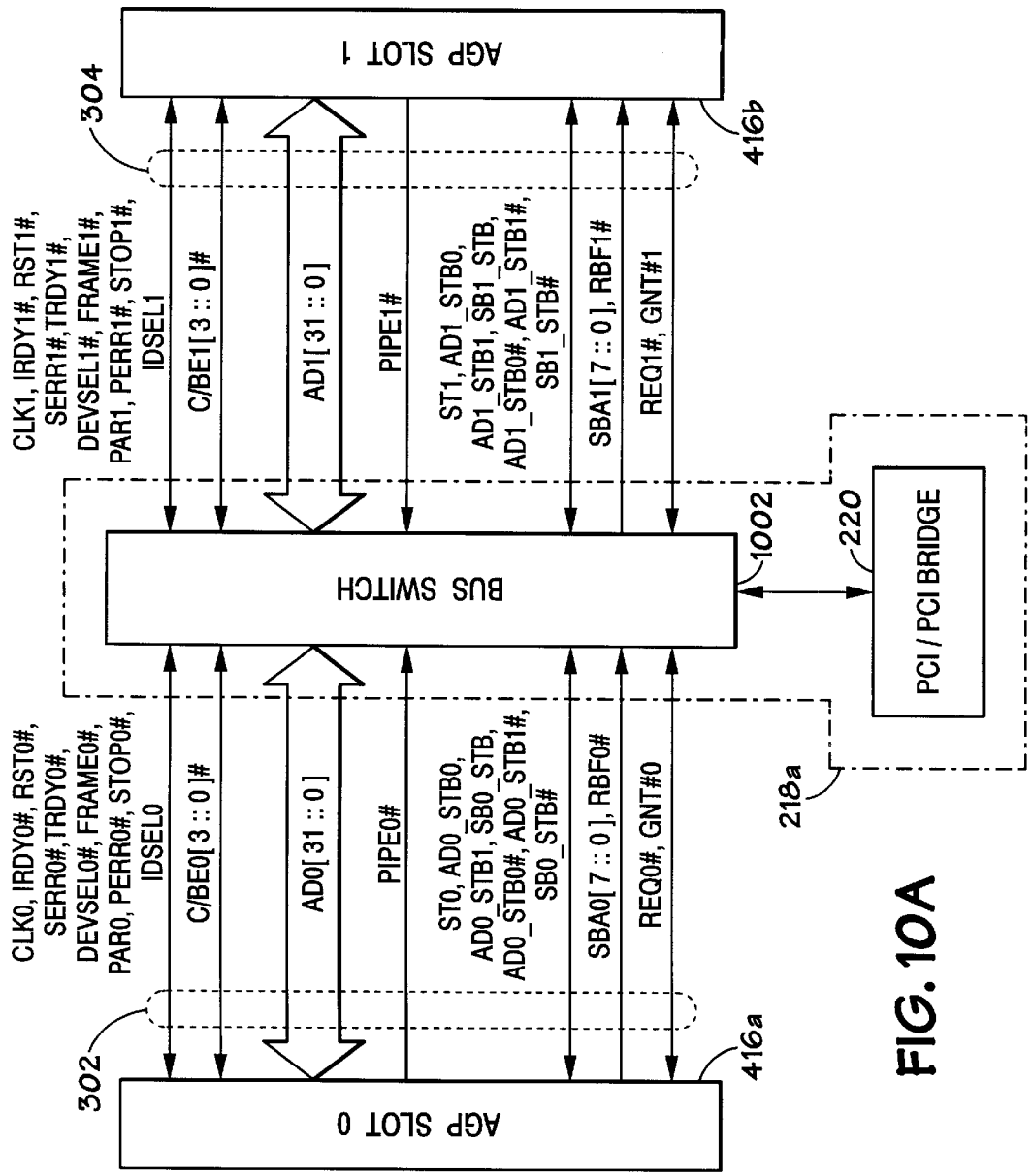
Figure 10B:
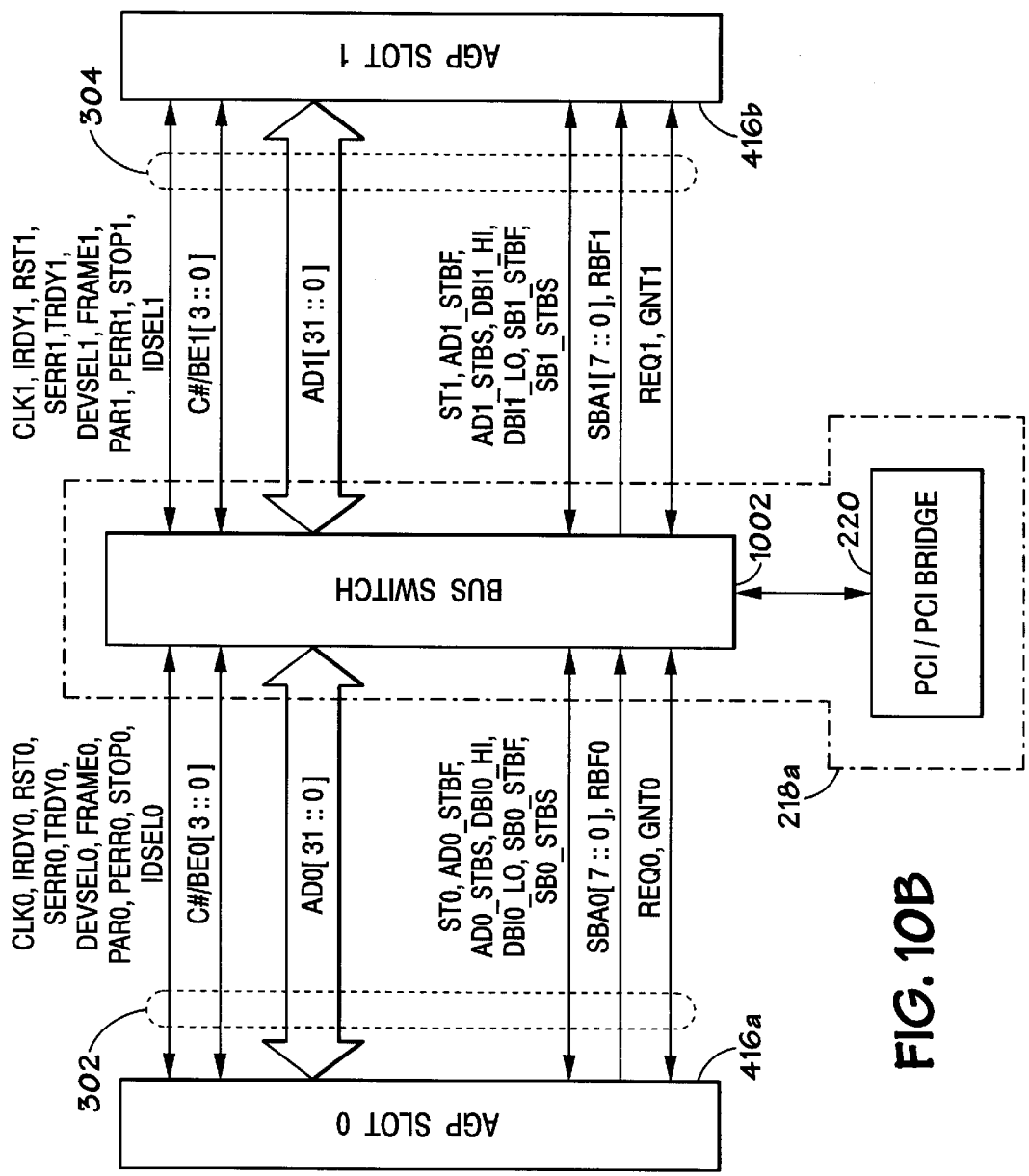

Referring to FIG. 10, a schematic functional block diagram of a portion of the embodiment disclosed in FIGS. 8 and 9 is illustrated. During POST when bus enumeration is determining what devices are in the computer system, an AGP device that may be plugged into the AGP connector 416b must be visible to the PCI/PCI bridge 220 in the AGP/PCI logic 218a. In order to do this the AD1[31::0] bus and related control signals must be "folded" or "collapsed" into the AD0[31::0] bus and related control signals connected to the AGP connector 416a. A bus switch 1002 effectively connects together the appropriate PCI signals of both of the AGP connectors 416a, 416b so that the PCI/PCI bridge 220 may be used during POST with standard bus enumeration software in the ROM BIOS and/or NVRAM. During POST, the bus switch 1002 reconfigures the independent AGP buses 302, 304 into a common parallel bus similar to the AGP bus 222 (see FIG. 5) so that the PCI/PCI bridge 220 is able to read from and write to both of the AGP devices connected to the AGP buses 302, 304.

Figure 11:
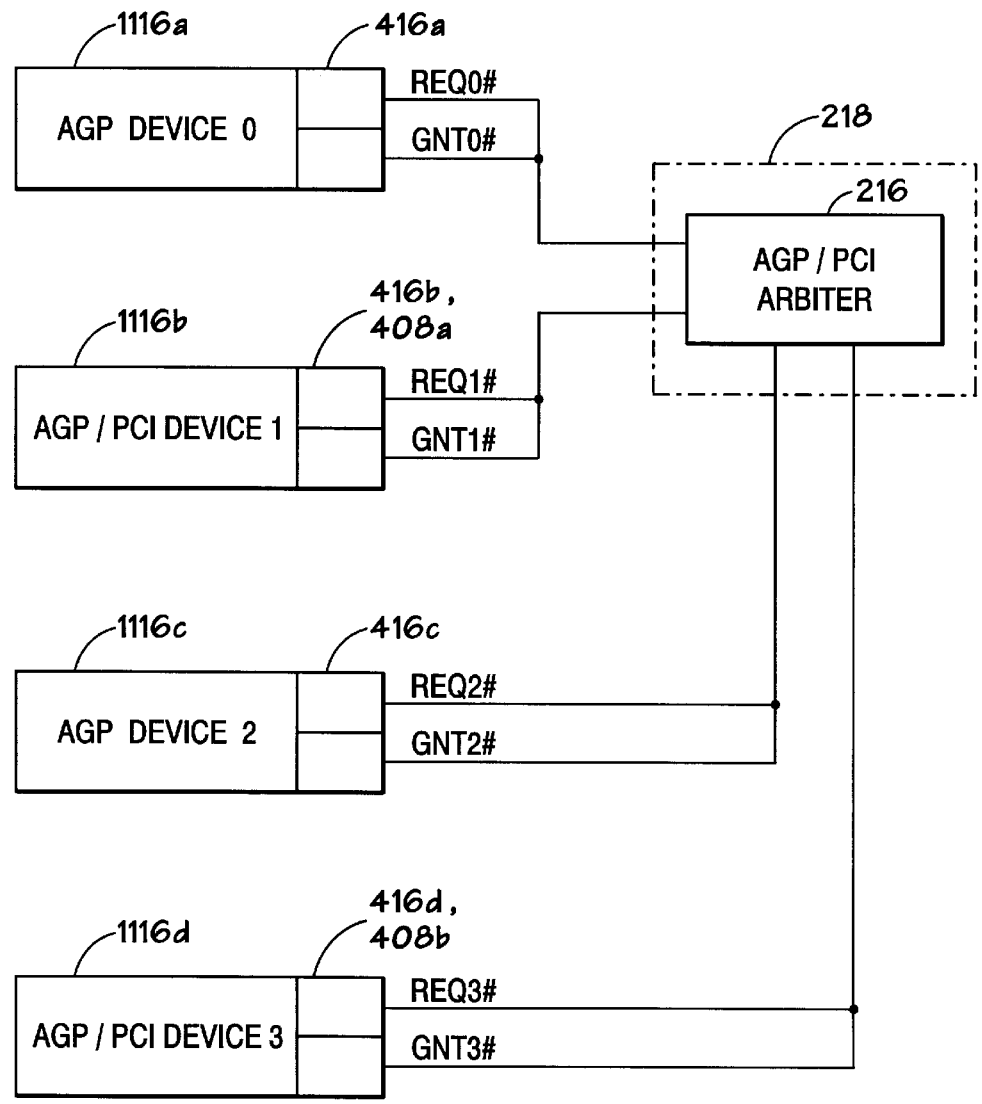
FIG. 11 is a schematic block wiring diagram of a portion of the embodiments of the present invention according to FIGS. 5–10.

Each AGP or PCI device requires request (REQ#) and grant (GNT#) signals. According to both the AGP and PCI specifications, a device is selected and allowed to become the bus master when it asserts its respective REQ# signal onto the bus and the arbiter acknowledges the device bus master request by asserting the respective GNT# signal back to device requesting the bus. In the AGP/PCI logic 218 of the present invention, request and grant signals are available for two or more AGP devices, or one or more AGP devices and one or more PCI devices. Referring to FIG. 11, this is partially illustrated by AGP connector 416a connected to REQ0# and GNT0# signals, AGP/PCI connector 416b/408a connected to REQ1# and GNT1# signals, AGP connector 416c connected to REG2# and GEN2# signals, and AGP/PCI connector 416d/408b connected to REQ3# and GNT3# signals from the AGP/PCI logic 218 and AGP/PCI arbiter 216. Thus, the multiple use core logic chip set of the present invention may be configured for a computer system having one or more AGP devices, one or more AGP devices in combination with one or more PCI devices, or just one or more PCI devices.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A computer system having a core logic chip set adapted for a plurality of accelerated graphics port (AGP) devices or one or more AGP devices and one or more peripheral component interconnect (PCI) devices, the AGP devices being compliant with Revision 2.0 of the AGP Specification (AGP 2.0 devices), the system comprising:

a central processing unit connected to a host bus;

a random access memory connected to a random access memory bus;

a core logic chip set comprising:
  a first AGP 2.0 request queue;
  a first AGP 2.0 reply queue;
  a second AGP 2.0 request queue;
  a second AGP 2.0 reply queue;
  a first AGP 2.0 data and control logic;
  a second AGP 2.0 data and control logic;
  an AGP 2.0 and PCI arbiter;
  a PCI data and control logic; and
  a PCI to PCI bridge;
  the first and second AGP 2.0 request and reply queues connected to a memory interface and control logic, the memory and interface control logic connected to the random access memory bus;
  the first and second AGP 2.0 data and control logic connected to the memory and interface control logic;
  the PCI data and control logic connected to the memory and interface control logic;
  the first and second AGP 2.0 data and control logic and PCI data and control logic connected to a host bus interface, the host bus interface connected to the host bus;
  a host to primary PCI bus bridge connected to the host bus interface and connected to a primary PCI bus;
  the PCI to PCI bridge connected to the first and second AGP 2.0 data and control logic, and the PCI data and control logic, wherein the PCI to PCI bridge transfers PCI information transactions between the host to primary PCI bus bridge and the first and second AGP 2.0 data and control logic, and the PCI data and control logic; and
  the first and second AGP 2.0 data and control logic, the PCI data and control logic, and the AGP 2.0 and PCI arbiter connected to a first AGP 2.0 bus having two AGP 2.0 devices or one AGP 2.0 device and one PCI device.

2. The computer system of claim 1, wherein the central processing unit is a plurality of central processing units.

3. The computer system of claim 1, wherein the core logic chip set is at least one integrated circuit.

4. The computer system of claim 3, wherein the at least one integrated circuit core logic chip set is at least one application specific integrated circuit.

5. The computer system of claim 1, further comprising a first AGP 2.0 device selected from the group consisting of a network interface card (NIC), small computer system interface (SCSI), wide area network digital router, or asynchronous transfer mode (AFM) interface card.

6. A computer system having a core logic chip set adapted for a plurality of accelerated graphics port (AGP) devices or one or more AGP devices and one or more peripheral component interconnect (PCI) devices, the AGP devices being compliant with Revision 3.0 of the AGP Specification (AGP 3.0 devices), the system comprising:
  a central processing unit connected to a host bus;
  a random access memory connected to a random access memory bus;
  a core logic chip set comprising:
    a first AGP 3.0 request queue;
    a first AGP 3.0 reply queue;
    a second AGP 3.0 request queue;
    a second AGP 3.0 reply queue;
    a first AGP 3.0 data and control logic;
    a second AGP 3.0 data and control logic;
    an AGP 3.0 and PCI arbiter;
    a PCI data and control logic; and
    a PCI to PCI bridge;
    the first and second AGP 3.0 request and reply queues connected to a memory interface and control logic, the memory and interface control logic connected to the random access memory bus;
    the first and second AGP 3.0 data and control logic connected to the memory and interface control logic;
    the PCI data and control logic connected to the memory and interface control logic;
    the first and second AGP 3.0 data and control logic and PCI data and control logic connected to a host bus interface, the host bus interface connected to the host bus;
    a host to primary PCI bus bridge connected to the host bus interface and connected to a primary PCI bus;
    the PCI to PCI bridge connected to the first and second AGP 3.0 data and control logic, and the PCI data and control logic, wherein the PCI to PCI bridge transfers PCI information transactions between the host to primary PCI bus bridge and the first and second AGP 3.0 data and control logic, and the PCI data and control logic; and
    the first and second AGP 3.0 data and control logic, the PCI data and control logic, and the AGP 3.0 and PCI arbiter connected to a first AGP 3.0 bus having two AGP 3.0 devices or one AGP 3.0 device and one PCI device.

7. The computer system of claim 6, wherein the central processing unit is a plurality of central processing units.

8. The computer system of claim 6, wherein the core logic chip set is at least one integrated circuit.

9. The computer system of claim 8, wherein the at least one integrated circuit core logic chip set is at least one application specific integrated circuit.

10. The computer system of claim 6, further comprising a first AGP 2.0 device selected from the group consisting of a network interface card (NIC), small computer system interface (SCSI), wide area network digital router, or asynchronous transfer mode (AFM) interface card.

11. A core logic chip set adapted for a plurality of accelerated graphics port (AGP) devices or at least one AGP device and at least one additional peripheral component interconnect (PCI) device, the AGP device(s) being compliant with Revision 2.0 of the AGP Specification (AGP 2.0 devices) comprising:
  a first AGP 2.0 request queue;
  a first AGP 2.0 reply queue;
  a second AGP 2.0 request queue;
  a second AGP 2.0 reply queue;
  a first AGP 2.0 data and control logic;
  a second AGP 2.0 data and control logic;
  a third AGP 2.0 request queue;
  a third AGP 2.0 reply queue;
  a fourth AGP 2.0 request queue;
  a fourth AGP 2.0 reply queue;
  a third AGP 2.0 data and control logic; and
  a fourth AGP 2.0 data and control logic;
  an AGP 2.0 and peripheral component interconnect arbiter;
  a PCI data and control logic;
  a PCI to PCI bridge;
  the first and second AGP 2.0 request and reply queues connected to a memory interface and control logic, the memory and interface control logic adapted for connection to a computer system random access memory;

the first and second AGP 2.0 data and control logic connected to the memory and interface control logic;

the PCI data and control logic connected to the memory and interface control logic;

the first and second AGP 2.0 data and control logic and PCI data and control logic connected to a host bus interface, the host bus interface adapted for connection to a computer system host bus having at least one central processing united connected thereto;

a host to primary PCI bus bridge connected to the host bus interface and adapted for connection to a computer system primary PCI bus;

the PCI to PCI bridge connected to the first and second AGP 2.0 data and control logic, and the PCI data and control logic, wherein the PCI to PCI bridge transfers PCI information transactions between the host to primary PCI bus bridge and the first and second AGP data and control logic, and the PCI data and control logic;

the third and fourth AGP 2.0 request and reply queues connected to the memory interface and control logic;

the third and fourth AGP 2.0 data and control logic connected to the memory and interface control logic;

the third and fourth AGP 2.0 data and control logic and PCI data and control logic connected to the host bus interface;

the PCI to PCI bridge connected to the third and fourth AGP 2.0 data and control logic, wherein the PCI to PCI bridge transfers PCI information transactions between the host to primary PCI bus bridge and the third and fourth AGP 2.0 data and control logic;

the first and second AGP 2.0 data and control logic, the PCI data and control logic, and the AGP 2.0 and PCI arbiter adapted for connection to a first AGP 2.0 bus having two AGP 2.0 devices or one AGP 2.0 device and one PCI device; and the third and fourth AGP 2.0 data and control logic, the PCI data and control logic, and the AGP 2.0 and PCI arbiter adapted for connection to a second AGP 2.0 bus having two AGP 2.0 devices or one AGP 2.0 device and one PCI device.

12. The core logic chip set of claim 11, further comprising the first AGP 2.0 data and control logic adapted for connection to a first AGP 2.0 sideband address bus.

13. The core logic chip set of claim 12, further comprising the second AGP 2.0 data and control logic adapted for connection to a second AGP 2.0 sideband address bus.

14. The core logic chip set of claim 13, further comprising the AGP 2.0 and PCI arbiter adapted for connection to the first and second sideband address buses.

15. The core logic chip set of claim 11 wherein, the core logic chipset is comprised of at least one integrated circuit.

16. A core logic chip set adapted for a plurality of accelerated graphics port (AGP) devices or at least one AGP device and at least one additional peripheral component interconnect (PCI) device, the AOP device(s) being compliant with Revision 3.0 of the AGP Specification (AGP 3.0 devices) comprising:

a first AGP 3.0 request queue;

a first AGP 3.0 reply queue;

a second AGP 3.0 request queue;

a second AGP 3.0 reply queue;

a first AGP 3.0 data and control logic;

a second AGP 3.0 data and control logic;

a third AGP 3.0 request queue;

a third AGP 3.0 reply queue;

a fourth AGP 3.0 request queue;

a fourth AGP 3.0 reply queue;

a third AGP 3.0 data and control logic; and a fourth AGP 3.0 data and control logic;

an AGP 3.0 and peripheral component interconnect arbiter;

a PCI data and control logic;

a PCI to PCI bridge;

the first and second AGP 3.0 request and reply queues connected to a memory interface and control logic, the memory and interface control logic adapted for connection to a computer system random access memory;

the first and second AGP 3.0 data and control logic connected to the memory and interface control logic;

the PCI data and control logic connected to the memory and interface control logic;

the first and second AGP 3.0 data and control logic and PCI data and control logic connected to a host bus interface, the host bus interface adapted for connection to a computer system host bus having at least one central processing united connected thereto;

a host to primary PCI bus bridge connected to the host bus interface and adapted for connection to a computer system primary PCI bus;

the PCI to PCI bridge connected to the first and second AGP 3.0 data and control logic, and the PCI data and control logic, wherein the PCI to PCI bridge transfers PCI information transactions between the host to primary PCI bus bridge and the first and second AGP data and control logic, and the PCI data and control logic;

the third and fourth AGP 3.0 request and reply queues connected to the memory interface and control logic;

the third and fourth AGP 3.0 data and control logic connected to the memory and interface control logic;

the third and fourth AGP 3.0 data and control logic and PCI data and control logic connected to the host bus interface;

the PCI to PCI bridge connected to the third and fourth AGP 3.0 data and control logic, wherein the PCI to PCI bridge transfers PCI information transactions between the host to primary PCI bus bridge and the third and fourth AGP 3.0 data and control logic;

the first and second AGP 3.0 data and control logic, the PCI data and control logic, and the AGP 3.0 and PCI arbiter adapted for connection to a first AGP 3.0 bus having two AGP 3.0 devices or one AGP 3.0 device and one PCI device; and the third and fourth AGP 3.0 data and control logic, the PCI data and control logic, and the AGP 3.0 and PCI arbiter adapted for connection to a second AGP 3.0 bus having two AGP 3.0 devices or one AGP 3.0 device and one PCI device.

17. The core logic chip set of claim 16, further comprising the first AGP 3.0 data and control logic adapted for connection to a first AGP 3.0 sideband address bus.

18. The core logic chip set of claim 17, further comprising the second AGP 3.0 data and control logic adapted for connection to a second AGP 3.0 sideband address bus.

19. The core logic chip set of claim 18, further comprising the AGP 3.0 and PCI arbiter adapted for connection to the first and second sideband address buses.

20. The core logic chip set of claim 16 wherein, the core logic chipset is comprised of at least one integrated circuit.

* * * * *